US011655767B2

(12) United States Patent
Hrubec et al.

(10) Patent No.: US 11,655,767 B2
(45) Date of Patent: May 23, 2023

(54) GEARBOX FOR AN ENGINE

(71) Applicant: GE Avio S.r.l., Turin (IT)

(72) Inventors: Juraj Hrubec, Prague (CZ); Ivan Golovin, Prague (CZ); Davide Lauria, Turin (IT)

(73) Assignee: GE AVIO S.R.L, Turin (IT)

( * ) Notice: Subject to any disclaimer, the term of this patent is extended or adjusted under 35 U.S.C. 154(b) by 104 days.

(21) Appl. No.: 17/168,368

(22) Filed: Feb. 5, 2021

(65) Prior Publication Data
US 2021/0310417 A1  Oct. 7, 2021

(30) Foreign Application Priority Data
Feb. 5, 2020 (IT) .................. 102020000002272

(51) Int. Cl.
*F02C 7/36* (2006.01)
*F16H 1/46* (2006.01)
*F16H 57/08* (2006.01)

(52) U.S. Cl.
CPC .............. *F02C 7/36* (2013.01); *F16H 1/46* (2013.01); *F16H 57/082* (2013.01); *F05D 2220/323* (2013.01); *F05D 2240/60* (2013.01); *F05D 2260/4031* (2013.01); *F05D 2260/70* (2013.01); *F16H 2057/085* (2013.01)

(58) Field of Classification Search
None
See application file for complete search history.

(56) References Cited

U.S. PATENT DOCUMENTS

| | | | |
|---|---|---|---|
| 3,309,936 A * | 3/1967 | Gaubis | F16H 37/041 |
| | | | 74/665 GA |
| 4,043,121 A | 8/1977 | Thomas et al. | |
| 8,096,917 B2 * | 1/2012 | Benito | F03D 15/10 |
| | | | 475/331 |
| 8,324,746 B2 * | 12/2012 | Bradbrook | F02C 3/10 |
| | | | 290/1 A |
| 10,202,865 B2 | 2/2019 | Breeze-Stringfellow et al. | |
| 10,260,419 B2 | 4/2019 | Cerny et al. | |
| 2010/0327109 A1 * | 12/2010 | Dooley | F02C 7/268 |
| | | | 244/50 |
| 2013/0000314 A1 * | 1/2013 | McCaffrey | F01D 13/003 |
| | | | 60/773 |
| 2018/0017079 A1 | 1/2018 | DiPietro, Jr. et al. | |
| 2020/0332721 A1 * | 10/2020 | Simon | F16H 1/28 |
| 2021/0017911 A1 * | 1/2021 | Spruce | F02C 7/36 |

FOREIGN PATENT DOCUMENTS

EP    3473893 A1    4/2019

OTHER PUBLICATIONS

Italian Search Report issued in corresponding Italian Application No. 102020000002272, dated May 18, 2020.

* cited by examiner

*Primary Examiner* — Kayla McCaffrey
(74) *Attorney, Agent, or Firm* — Venable LLP; Peter T. Hrubiec; Michele V. Frank

(57) ABSTRACT

A gearbox for an engine includes a rotating element and a turbomachine, the turbomachine includes a shaft, and the rotating element is driven by the shaft across the gearbox. The gearbox includes a ring gear, a first sun gear and a second sun gear each configured to be driven by the shaft of the turbomachine, a first planet gear comprising a first gear portion and a second gear portion, and a second planet gear comprising a first gear portion and a second gear portion.

14 Claims, 16 Drawing Sheets

GEARBOX FOR AN ENGINE

GOVERNMENT SPONSORED RESEARCH

The project leading to this application has received funding from the Clean Sky 2 Joint Undertaking under the European Union's Horizon 2020 research and innovation program under grant agreement No. CS2-LPA-GAM-2018/2019-01.

The present application claims the benefit of Italian Patent Application No. 102020000002272, filed on Feb. 5, 2020, which is hereby incorporated by reference herein in its entirety.

FIELD OF THE DISCLOSURE

The technology described herein relates to a gearbox assembly for an engine, such as for a gas turbine engine.

BACKGROUND OF THE DISCLOSURE

A turbofan engine operates on the principle that a central gas turbine core drives a bypass fan, the bypass fan being located at a radial location between a nacelle of the engine and the engine core. With such a configuration, the engine is generally limited in a permissible size of the bypass fan, as increasing a size of the fan correspondingly increases a size and weight of the nacelle.

An open rotor engine, by contrast, operates on the principle of having the bypass fan located outside of the engine nacelle. This permits the use of larger rotor blades able to act upon a larger volume of air than for a traditional turbofan engine, potentially improving propulsive efficiency over conventional turbofan engine designs.

Turbomachines such as open rotor engines may require large gear ratios between the low speed spool and the fan rotor to permit the larger rotor blades to act upon a larger volume of air and/or to do so at certain desired operating speeds of the engine or aircraft. One challenge is that known gear assemblies may provide inadequate gear ratios for desired open rotor engine operation. For example, known gear assemblies may inadequately reduce the output rotational speed relative to the turbines, such that the fan rotor operates too fast and inefficient and/or the turbine operates too slow and inefficient. Another challenge is that known gear assemblies that may be scaled to provide adequate gear ratios may be too large for a desired length and/or diameter of the engine. Yet another challenge is that known gear assemblies may be inadequate for receiving single input-speed shafts. For instance, higher speed core engines and turbines, such as in contrast to multiple-input turbine shafts, may be incompatible with single input gear assemblies, along with constraints relative to engine length, diameter, or gear ratio.

Still certain turbomachine architectures, such as three-stream architectures including a core flow, a fan bypass, and a compressor bypass, may require larger core engine diameters in contrast to conventional two-stream architectures (i.e., fan bypass and core flow). With such configurations, space for a gear assembly is limited.

As such, there is a need for gear assemblies suitable for open rotor engines, three-stream architectures, or both. Particularly, there is a need for gear assemblies that may receive relatively high speed turbine inputs, single-speed turbine inputs, and/or arrangements within desired diametrical and/or length constraints, as may be suitable for open rotor engines and/or three-stream architecture engines.

BRIEF DESCRIPTION OF THE DISCLOSURE

Aspects and advantages of the invention will be set forth in part in the following description, or may be obvious from the description, or may be learned through practice of the invention.

In one embodiment, a gearbox for an engine is provided. The gearbox includes a rotating element and a turbomachine, the turbomachine includes a shaft, and the rotating element is driven by the shaft across the gearbox. The gearbox includes a ring gear; a first sun gear and a second sun gear each configured to be driven by the shaft of the turbomachine; a first planet gear comprising a first gear portion and a second gear portion, wherein the first gear portion of the first planet gear meshes with the first sun gear at a location forward of the ring gear along the axial direction, and wherein the second gear portion of the first planet gear meshes with the ring gear; and a second planet gear comprising a first gear portion and a second gear portion, wherein the first gear portion of the second planet gear meshes with the first sun gear at a location aft of the ring gear along the axial direction, and wherein the second gear portion of the second planet gear meshes with the ring gear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The accompanying drawings, which are incorporated in and constitute a part of the specification, illustrate one or more embodiments and, together with the description, explain these embodiments. In the drawings.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE DISCLOSURE

Figure 1:
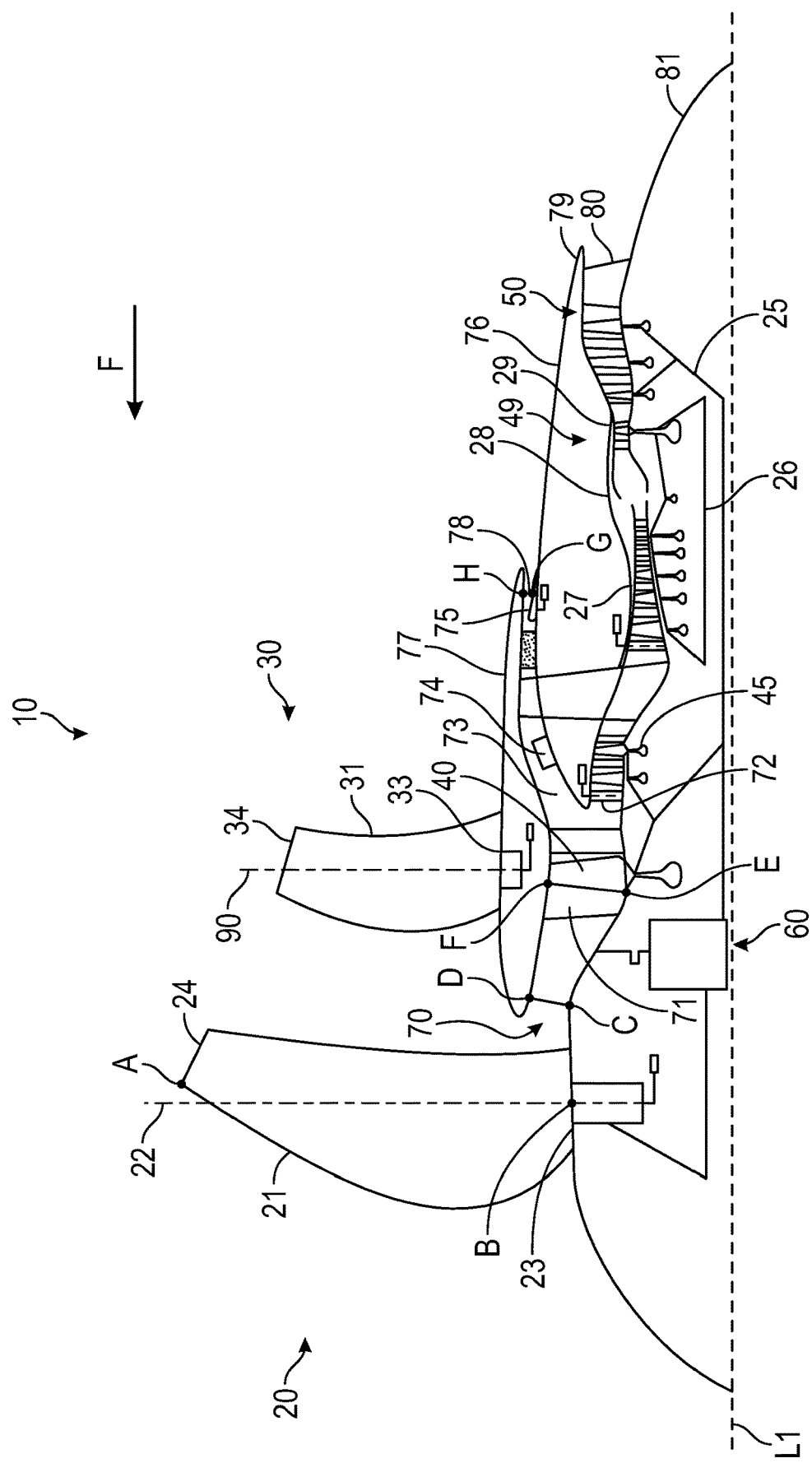
FIG. 1 is a cross-sectional schematic illustration of an exemplary embodiment of an open rotor propulsion system.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

All directional references (e.g., radial, axial, proximal, distal, upper, lower, upward, downward, left, right, lateral, front, back, top, bottom, above, below, vertical, horizontal, clockwise, counterclockwise, upstream, downstream, etc.) are only used for identification purposes to aid the reader's understanding of the present invention, and do not create limitations, particularly as to the position, orientation, or use of the invention. The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 2, 5, 10, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Part 1

FIG. 1 shows an elevational cross-sectional view of an exemplary embodiment of an open rotor propulsion system 10. As is seen from FIG. 1, the open rotor propulsion system 10 has a rotating element 20 which includes an array of fan airfoil blades 21 around a central longitudinal axis 11 of the open rotor propulsion system 10. Blades 21 are arranged in typically equally spaced relation around the centerline 11, and each blade 21 has a root 23 and a tip 24, and a span defined therebetween, as well as a central blade axis 22. Open rotor propulsion system 10 includes a gas turbine engine having a gas turbine core 49 and a low pressure (LP) turbine 50. Gas turbine core 49 includes a high pressure (HP) compressor 27, a combustor 28, and a high pressure (HP) turbine 29 in serial flow relationship. A high pressure (HP) shaft 26 enables the HP turbine 29 to drive the HP compressor 27. A low pressure (LP) shaft 25 enables the LP turbine 50 to drive the rotating element 20 and low pressure (LP) compressor, or booster, 45.

Figure 2:
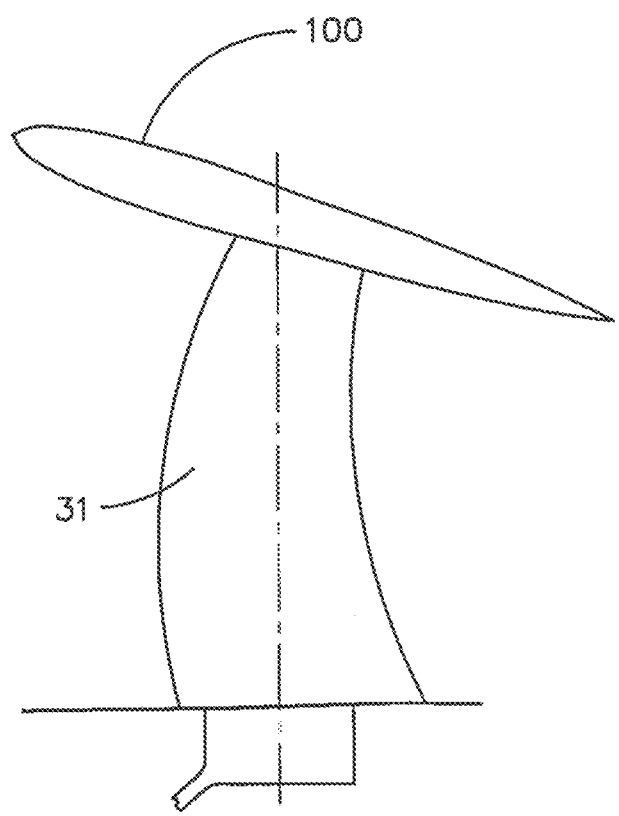
FIG. 2 is an illustration of an alternative embodiment of an exemplary vane assembly for an open rotor propulsion system.

Open rotor propulsion system 10 also includes, in the exemplary embodiment of FIG. 1, a non-rotating stationary element 30 which includes an array of vanes 31 also disposed around central axis 11, and each vane 31 has a root 33 and a tip 34 and a span defined therebetween. These vanes 31 may be arranged such that they are not all equidistant from the rotating assembly, and be unshrouded (as shown in FIG. 1) or may optionally include an annular shroud or duct 100 (as shown in FIG. 2) distally from axis 11 (axis 11 is shown in FIG. 1). These vanes are mounted to a stationary frame and do not rotate relative to the central axis 11, but may include a mechanism for adjusting their orientation relative to their axis 90 and/or relative to the blades 21. For reference purposes, FIG. 1 also depicts a Forward direction denoted with arrow F, which in turn defines the forward and aft portions of the system. As shown in FIG. 1, the rotating element 20 is located forward of the gas turbine core 49 in a "puller" configuration, and the exhaust 80 is located aft of the stationary element 30.

Figure 3:
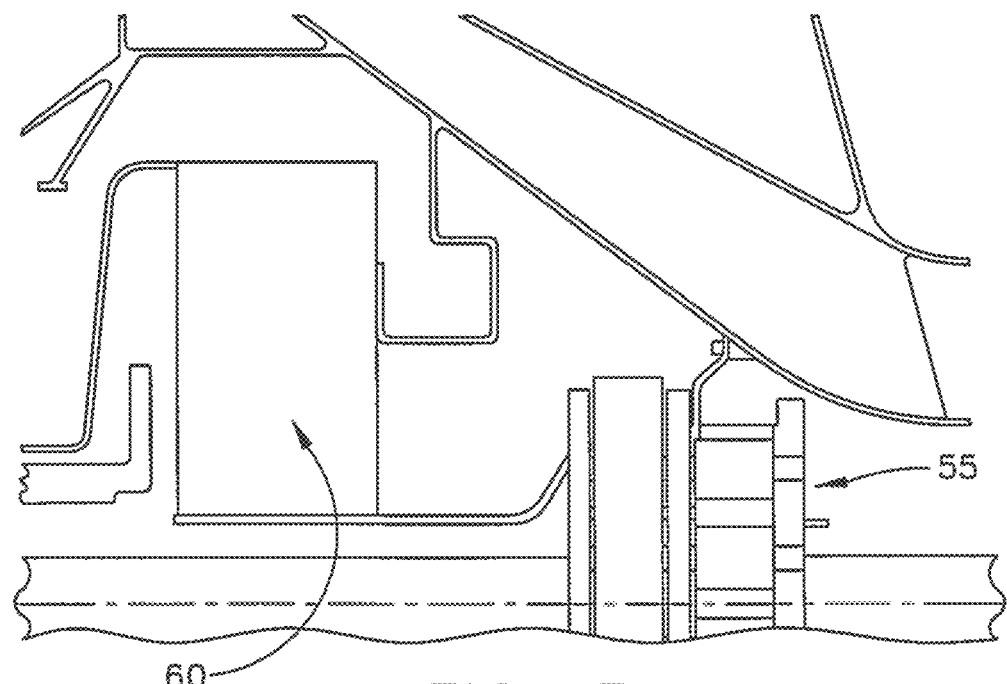
FIG. 3 is a partial cross-sectional schematic illustration of an exemplary embodiment of an open rotor propulsion system depicting an exemplary compound gearbox configuration.
Figure 4:
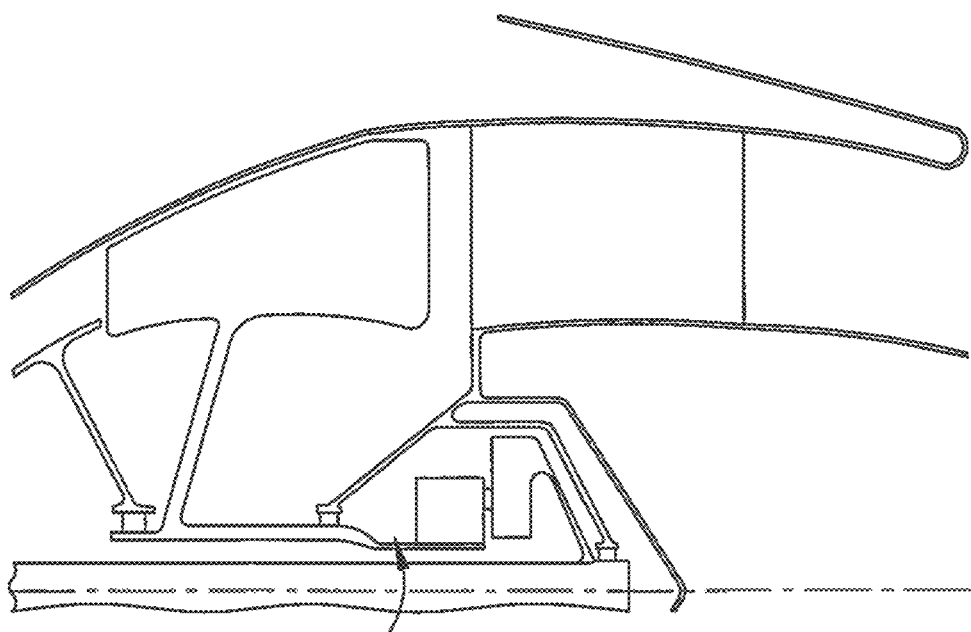
FIG. 4 is a partial cross-sectional schematic illustration of an exemplary embodiment of an open rotor propulsion system depicting another exemplary gearbox configuration.

Left- or right-handed engine configurations, useful for certain installations in reducing the impact of multi-engine torque upon an aircraft, can be achieved by mirroring the airfoils of 21, 31, and 50 such that the rotating element 20 rotates clockwise for one propulsion system and counterclockwise for the other propulsion system. As an alternative, an optional reversing gearbox 55 (located in or behind the low pressure turbine 50 as shown in FIG. 4 or combined or associated with power gearbox 60 as shown in FIG. 3) permits a common gas turbine core 49 and low pressure turbine 50 to be used to rotate the fan blades either clockwise or counterclockwise, i.e., to provide either left- or right-handed configurations, as desired, such as to provide a pair of oppositely-rotating engine assemblies can be provided for certain aircraft installations while eliminating the need to have internal engine parts designed for opposite rotation directions. Open rotor propulsion system 10 in the embodiment shown in FIG. 1 also includes a power gearbox 60 which may include a gearset for decreasing the rotational speed of the rotating element 20 relative to the low pressure turbine 50. The blades 21 of the open, unducted rotating element may have a fixed pitch or blade angle, or may instead have a variable pitch or blade angle to vary thrust and blade loading during operation and, in some configurations, to provide a reverse thrust configuration for aircraft deceleration upon landing.

In addition to the noise reduction benefit, the duct 100 shown in FIG. 2 provides a benefit for vibratory response and structural integrity of the stationary vanes 31 by coupling them into an assembly forming an annular ring or one or more circumferential sectors, i.e., segments forming portions of an annular ring linking two or more vanes 31 such as pairs forming doublets. The duct 100 may allow the pitch of the vanes to be varied as desired.

A significant, perhaps even dominant, portion of the noise generated by the disclosed fan concept, e.g., the embodiment of FIG. 1, is associated with the interaction between wakes and turbulent flow generated by the upstream blades 21 and its acceleration and impingement on the downstream vanes 31. By introducing a partial duct acting as a shroud over the stationary vanes, the noise generated at the vane surface can be shielded to effectively create a shadow zone in the far field thereby reducing overall annoyance. As the duct is increased in axial length, the efficiency of acoustic radiation through the duct is further affected by the phenomenon of acoustic cut-off, which can be employed, as it is for conventional aircraft engines, to limit the sound radiating into the far-field. Furthermore, the introduction of the shroud allows for the opportunity to integrate acoustic treatment as it is currently done for conventional aircraft engines to attenuate sound as it reflects or otherwise interacts with the liner. By introducing acoustically treated surfaces on both the interior side of the shroud and the hub surfaces upstream and downstream of the stationary vanes 31, multiple reflections of acoustic waves emanating from the stationary vanes can be substantially attenuated.

In operation, the rotating blades 21 are driven by the low pressure turbine 50 via gearbox 60 such that they rotate around the axis 11 and generate thrust to propel the open rotor propulsion system 10, and hence an aircraft to which it is associated, in the forward direction F.

It may be desirable that either or both of the blades 21 or the vanes 31 incorporate a pitch change mechanism such that the blades can be rotated with respect to an axis of pitch rotation (annotated as 22 or 90, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 31 are sized, shaped, and configured to impart a counteracting swirl to the fluid so that in a downstream direction aft of both blades 21 and vanes 31 the fluid has a greatly reduced degree of swirl, which translates to an increased level of induced efficiency. Vanes 31 may have a shorter span than blades 21, as shown in FIG. 1, for example, 50% of the span of blades 21, or may have longer span or the same span as blades 21 as desired. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

Blades 21 may be sized, shaped, and contoured with the desired blade loading in mind. One possible blade architecture is shown and described in commonly-assigned, issued U.S. Pat. No. 10,202,865, which is included as Appendix 1.

In the embodiment shown in FIG. 1, an annular 360 degree inlet 70 is located between the rotating element 20 and the fixed or stationary element 30, and provides a path for incoming atmospheric air to enter the gas turbine core 49 radially inwardly of the stationary element 30. Such a location may be advantageous for a variety of reasons, including management of icing performance as well as protecting the inlet 70 from various objects and materials as may be encountered in operation.

FIG. 1 illustrates what may be termed a "puller" configuration where the thrust-generating rotating element 20 is located forward of the gas turbine core 49. Other configurations are possible and contemplated as within the scope of the present disclosure, such as what may be termed a "pusher" configuration embodiment where the gas turbine core 49 is located forward of the rotating element 20. A variety of architectures are shown and described in commonly-assigned, US patent application publication US2015/0291276A1, which is included as Appendix 2.

The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

In the exemplary embodiment of FIG. 1, in addition to the open rotor or unducted rotating element 20 with its plurality of fan airfoil blades 21, a ducted fan 40 is included behind the open rotor rotating element 20, such that the open rotor propulsion system 10 includes both a ducted and an unducted fan which both serve to generate thrust through the movement of air at atmospheric temperature without passage through the gas turbine core 49. The ducted fan 40 is shown at about the same axial location as vane 31, and radially inward of the vane root 33. Alternatively, the ducted fan 40 may be between the vane 31 and core duct 72, or be farther forward of the vane 31. The ducted fan 40 may be driven by the low pressure turbine 50, or by any other suitable source of rotation, and may serve as the first stage of booster 45 or may be operated separately. Air entering the inlet 70 flows through an inlet duct 71 and then is divided such that a portion flows through a core duct 72 and a portion flows through a fan duct 73. Fan duct 73 may incorporate heat exchangers 74, and exhausts to the atmosphere through an independent fixed or variable nozzle 78 aft of the stationary element 30 and outside of the gas generator core cowl 76. Air flowing through the fan duct 73 thus "bypasses" the core of the engine and does not pass through the core. Open rotor propulsion system 10 therefore includes an unducted fan formed by rotating element 20, followed by a ducted fan 40, which directs airflow into two concentric or non-concentric ducts 72 and 73, thereby forming a three stream engine architecture with 3 paths for air which passes through the rotating element 20.

Actuation for the nozzle 75 may be linked to the outlet guide vanes (OGVs), booster variable stator vanes (VSVs), and/or variable bleed valves (VBVs) and it may be mechanically linked to booster inlet guide vanes (IGVs), VBVs, and/or vane 31 actuation. Ducted fan 40 may include a fixed or variable inlet guide vane (IGV) 44 and a fixed or variable outlet guide vane (OGV) 43 and the fan duct 73 may include struts, optionally aerodynamically shaped, such as struts 41 and 42. If a VBV system is present, the exhaust may be mixed into the ducted fan bypass stream and exit through the nozzle 78.

Figure 5:
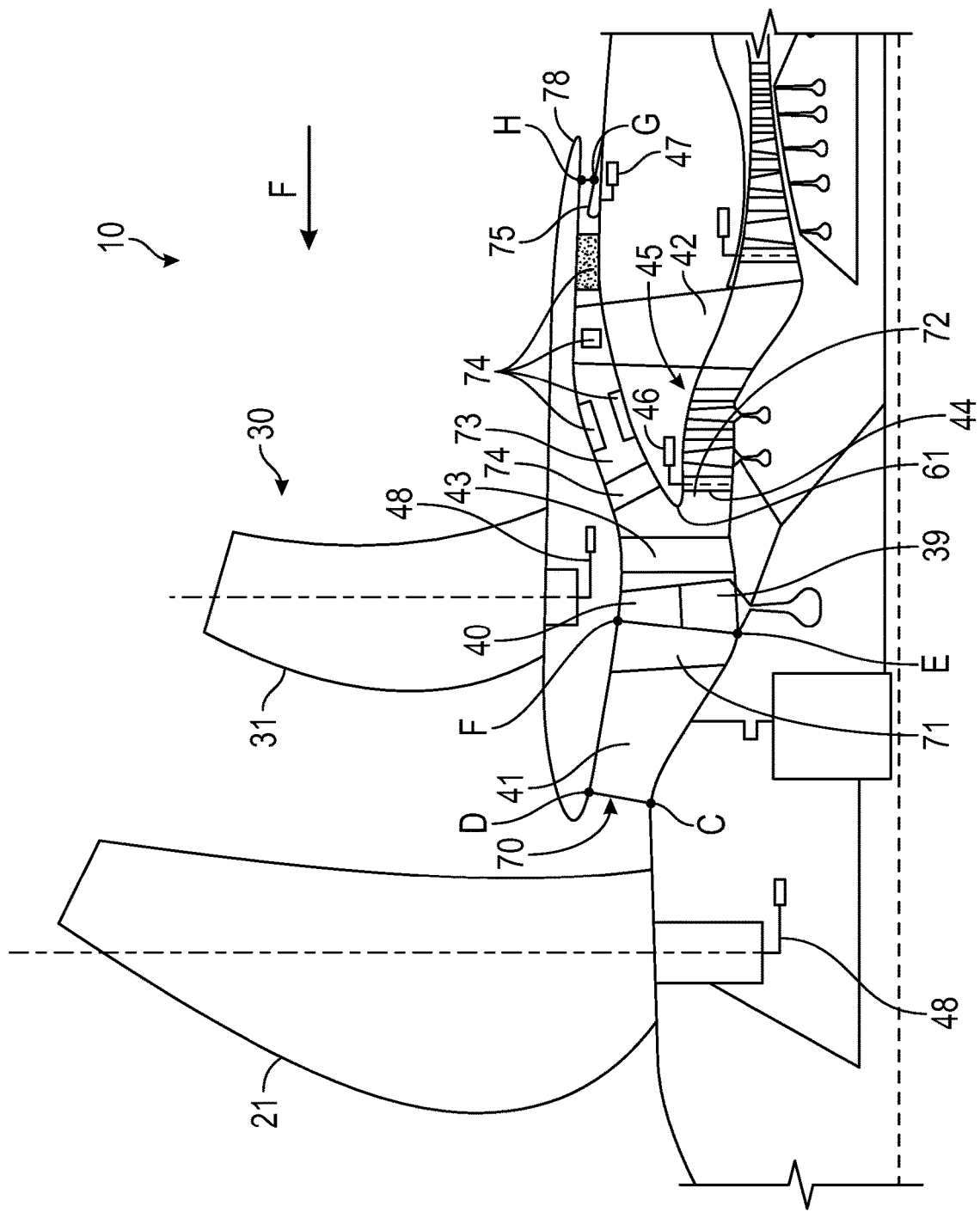
FIG. 5 is an enlarged, partial cross-sectional schematic illustration of the open rotor propulsion system of FIG. 1, depicting an exemplary heat exchanger installation in the fan duct.

In the exemplary embodiment shown in FIGS. 1 and 5, a slidable, moveable, and/or translatable plug nozzle 75 with an actuator 47 may be included in order to vary the exit area of the nozzle 78. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 78 has a consistent "home" position to which it returns in the event of any system failure, which may prevent commands from reaching the nozzle 78 and/or its actuator 47.

Since the open rotor propulsion system 10 includes both an open rotor rotating assembly 20 and a ducted fan assembly 40, the thrust output of both and the work split between them can be tailored to achieve specific thrust, fuel burn, thermal management, and acoustic signature objectives which may be superior to those of a typical ducted fan gas turbine propulsion assembly of comparable thrust class. The ducted fan assembly 40, by lessening the proportion of the thrust required to be provided by the unducted fan assembly 20, may permit a reduction in the overall fan diameter of the unducted fan assembly and thereby provide for installation flexibility and reduced weight.

Operationally, the open rotor propulsion system 10 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow.

The ducted fan stream flowing through fan duct 73 may include one or more heat exchangers 74 for removing heat from various fluids used in engine operation (such as an air-cooled oil cooler (ACOC), cooled cooling air (CCA), etc.). The heat exchangers 74 may take advantage of the integration into the fan duct 73 with reduced performance penalties (such as fuel efficiency and thrust) compared with traditional ducted fan architectures, due to not impacting the primary source of thrust which is, in this case, the unducted fan stream which is the major source of engine thrust. Heat exchangers may cool fluids such as gearbox oil, engine sump oil, thermal transport fluids such as supercritical fluids or commercially available single-phase or two-phase fluids (supercritical CO2, EGV, Syltherm 800, liquid metals, etc.), engine bleed air, etc. Heat exchangers may also be made up of different segments or passages that cool different working fluids, such as an ACOC paired with a fuel cooler.

Heat exchangers 74 may be incorporated into a thermal management system which provides for thermal transport via a heat exchange fluid flowing through a network to remove heat from a source and transport it to a heat exchanger. One such system is described in commonly-assigned, issued U.S. Pat. No. 10,260,419, which is included as Appendix 3.

Since the fan pressure ratio is higher for the ducted fan than for the unducted fan, the fan duct provides an environment where more compact heat exchangers may be utilized than would be possible if installed on the outside of the core cowl in the unducted fan stream. Fan bypass air is at a very low Fan Pressure Ratio (FPR) (1.05 to 1.08), making it difficult to drive air through heat exchangers. Without the availability of a fan duct as described herein, scoops or booster bleed air may be required to provide cooling air to and through heat exchangers. A set of parameters can be developed around heat exchangers in the fan duct, based on heat load, heat exchanger size, ducted fan stream corrected flow, and ducted fan stream temperature.

The fan duct 73 also provides other advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the core cowl 76 and the exhaust plane 80. The close-out angle is normally limited by air flow separation, but boundary layer energization by air from the fan duct 73 exhausting over the core cowl reduces air flow separation. This yields a shorter, lighter structure with less frictional surface drag.

FIG. 5 is an enlarged, partial cross-sectional schematic illustration of the open rotor propulsion system of FIG. 1, depicting an exemplary heat exchanger installation in the fan duct. Heat exchanger 74 may comprise any suitable heat exchanger design and installation, including surface coolers extending circumferentially around a substantial portion of the inner surface of the fan cowl, or the outer surface of the core cowl (as shown in FIG. 5) within the fan duct, or may be one or more discrete exchangers of the "brick" design where the heat exchanger is a discrete element with fluid conduits and heat transfer aids such as fins combined into a compact configuration which can be placed at suitable annular locations or affixed to structures such as struts or OGV's. Surface coolers typically include a single layer of cooling passages in an exchanger mounted to a surface over which a cooling fluid such as air passes. Conventional plate-fin (or similar) orthogonal exchangers typically include several layers of fluid passages and the cooling fluid such as air passes between the passages. These "brick" type exchangers typically are more compact in overall lateral dimensions but protrude farther into the air flow, while surface coolers typically have a broader lateral dimension and protrude less into the air flow.

Additional elements shown in this enlarged view in FIG. 5 include the ducted fan outlet guide vanes (OGV's) 43, which may be fixed or variable, booster inlet guide vanes (IGV's) 44, and the splitter 61 which divides the inlet duct flow into the core stream entering the core duct 72 and the fan stream flowing through the fan duct 73. An actuator 46 may be utilized to adjust the booster IGV 44. A pitch change mechanism 48 is also shown associated with the vanes 31 of the stationary element or blade row 30. Also, FIG. 5 depicts a variation of the ducted fan 40 in that a splittered rotor with part-span blades 39 interdigitated with full-span blades 39 may be incorporated. Splittered rotors are described in greater detail in commonly-assigned US patent application publication US 2018/0017079A1, which is included as Appendix 4.

Figure 6:
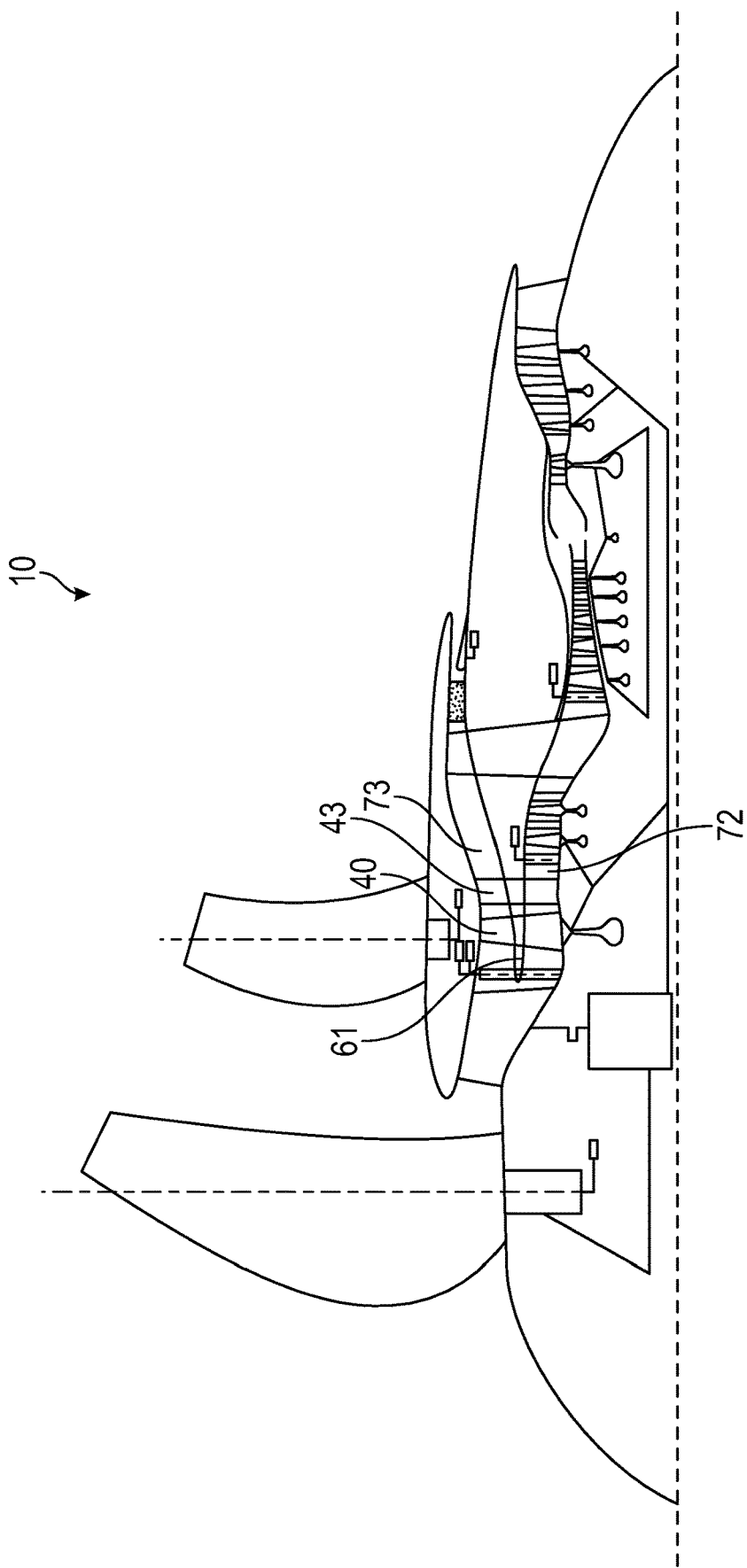
FIG. 6 is a cross-sectional schematic illustration of an exemplary embodiment of an open rotor propulsion system.
Figure 7:
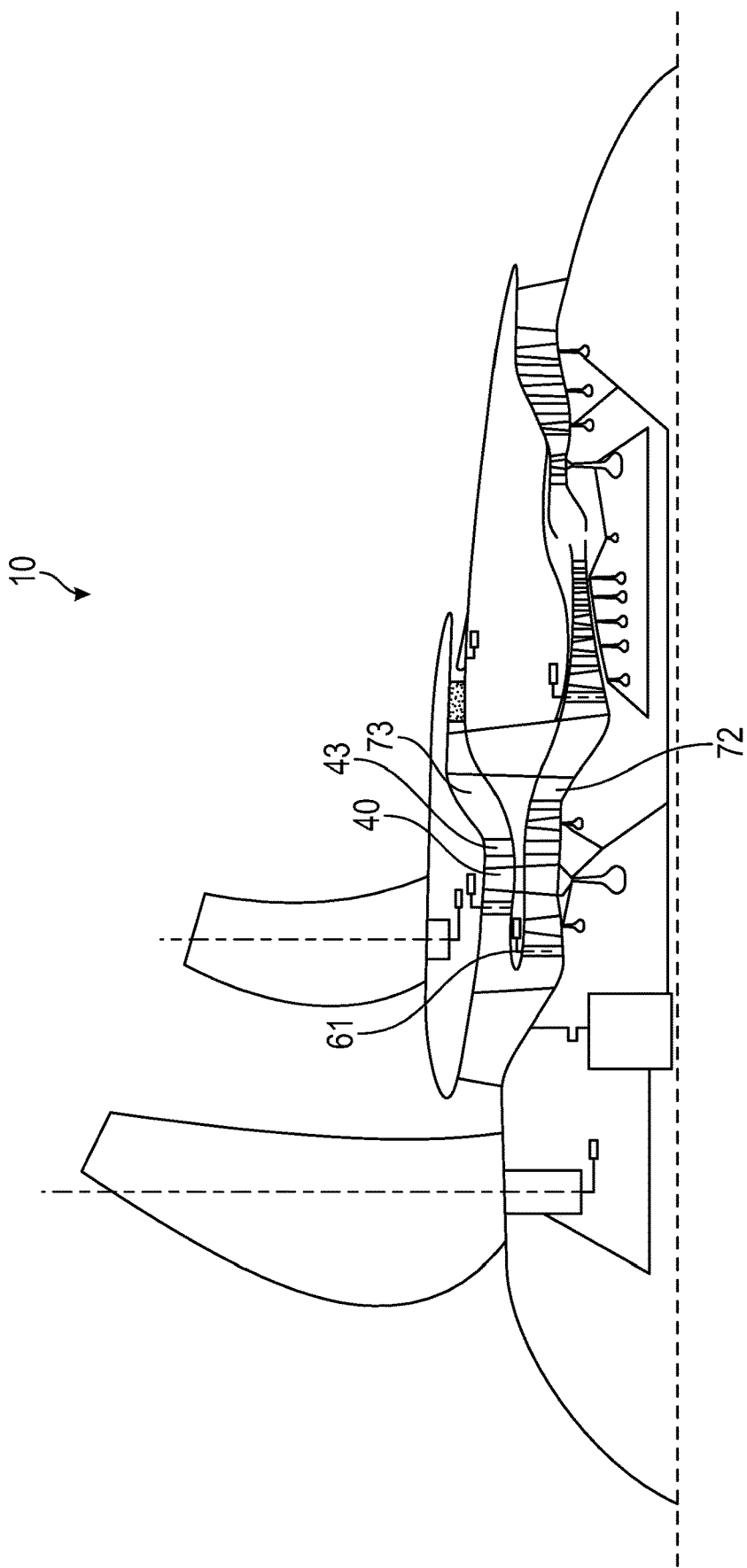
FIG. 7 is a cross-sectional schematic illustration of an exemplary embodiment of an open rotor propulsion system.

In a variation of the configuration depicted in FIG. 5, the splitter 61 may carry forward to the aft edge of the rotating ducted fan blades 40 and the fan blades 40 themselves may include an integral splitter which effectively divides the air stream into radially inner and radially outer streams in proximity to the fan itself. This may be termed a blade-on-blade configuration where radially inner and radially outer blades are effectively superimposed upon one another and may be unitarily formed or otherwise fabricated to achieve the split between streams. FIGS. 6 and 7 illustrate embodiments with such a blade-on-blade configuration. Such configurations are described in greater detail in commonly-assigned, issued U.S. Pat. No. 4,043,121, which is included as Appendix 5.

Figure 8:
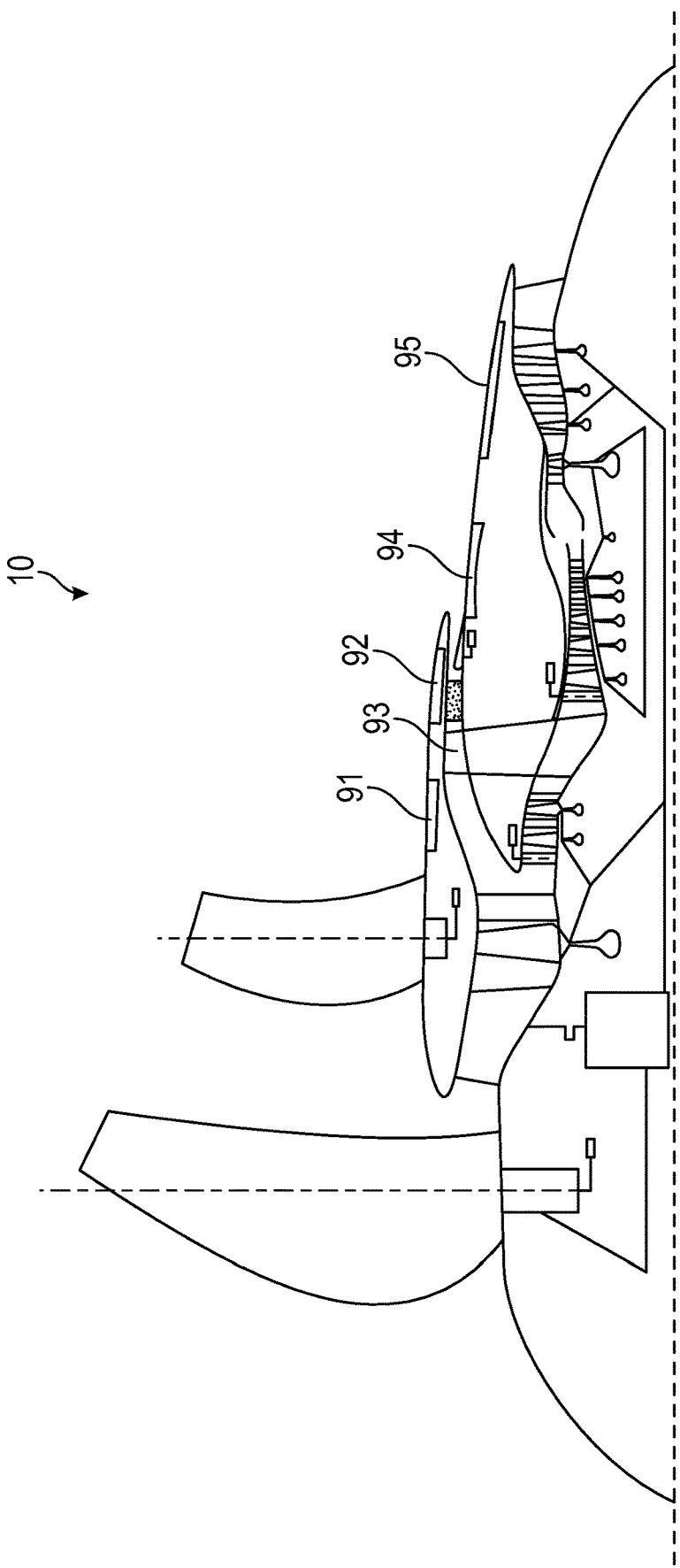
FIG. 8 is a cross-sectional schematic illustration of an exemplary embodiment of an open rotor propulsion system, depicting potential locations for acoustic treatment.

FIG. 8 is a cross-sectional schematic illustration of an exemplary embodiment of an open rotor propulsion system 10, depicting potential locations for noise suppression materials or structures in order to reduce noise emitted from the propulsion system. One potential location, 91, is on the outer surface of the fan cowl 77, aft of the vanes 31, while another potential location 93 is on the surface of the strut 42 within the fan duct 73. Location 92 is on the aft surface of the fan cowl 77, while location 94 is located on the core cowl 76 aft of the fan nozzle 78. Finally, location 95 is on the surface of the core cowl 76 downstream of the fan nozzle 78. Any suitable materials and designs may be utilized for noise suppression, including perforated panels, textured surfaces, and metallic and/or composite materials manufactured by any suitable techniques. Noise suppression materials or structures may be targeted toward noise from the core gas turbine engine, the ducted fan, or the unducted fan, or any combination thereof, and may be applied to propulsion system surfaces or may be a feature incorporated into the surfaces themselves.

Broadband acoustic treatment to suppress noise over a wide spectrum may utilize a composite shell with an internal chopped fiber system. High temperature areas with limited fluid interactions can use Ox-Ox Ceramic Matric Composite (CMC). Composite plies, or even the chopped fiber itself, can be selected in order to act as a firewall barrier in addition to an acoustics suppression device (e.g., Nextel 312 fiber). Lower temperature broadband acoustic treatment systems can use a more traditional fluid absorption tolerant composite material with chopped carbon fiber. BMI, MVK, or RM1100 are all viable composite material systems that have increasing levels of temperature capability, and can be selected depending on the thermal environment.

Tuned high temperature composite noise suppression systems compete directly with Titanium systems. Tuned honeycomb RM1100 panels offer a possible cost reduction compared to bonded/hot formed Titanium honeycomb panels. Ox-Ox tuned panels could provide temperature capability beyond that of Titanium material systems.

Additional noise suppression features could include the integration of geometrical shapes such as Chevrons into the trailing edge of the fan nozzle 78 and/or the trailing edge of the core nozzle 79. Other locations for noise suppression features could include the ducted fan inlet (between locations D and F) and the fan duct downstream of the ducted fan 40.

OGV's for the ducted fan may be slatted, tandem, or single, and may be of metallic or composite construction and fabricated using any suitable manufacturing method. Blades 21 and vanes 31, as well as blades 40, may also be of metallic or composite construction and fabricated using any suitable manufacturing method.

Figure 9:
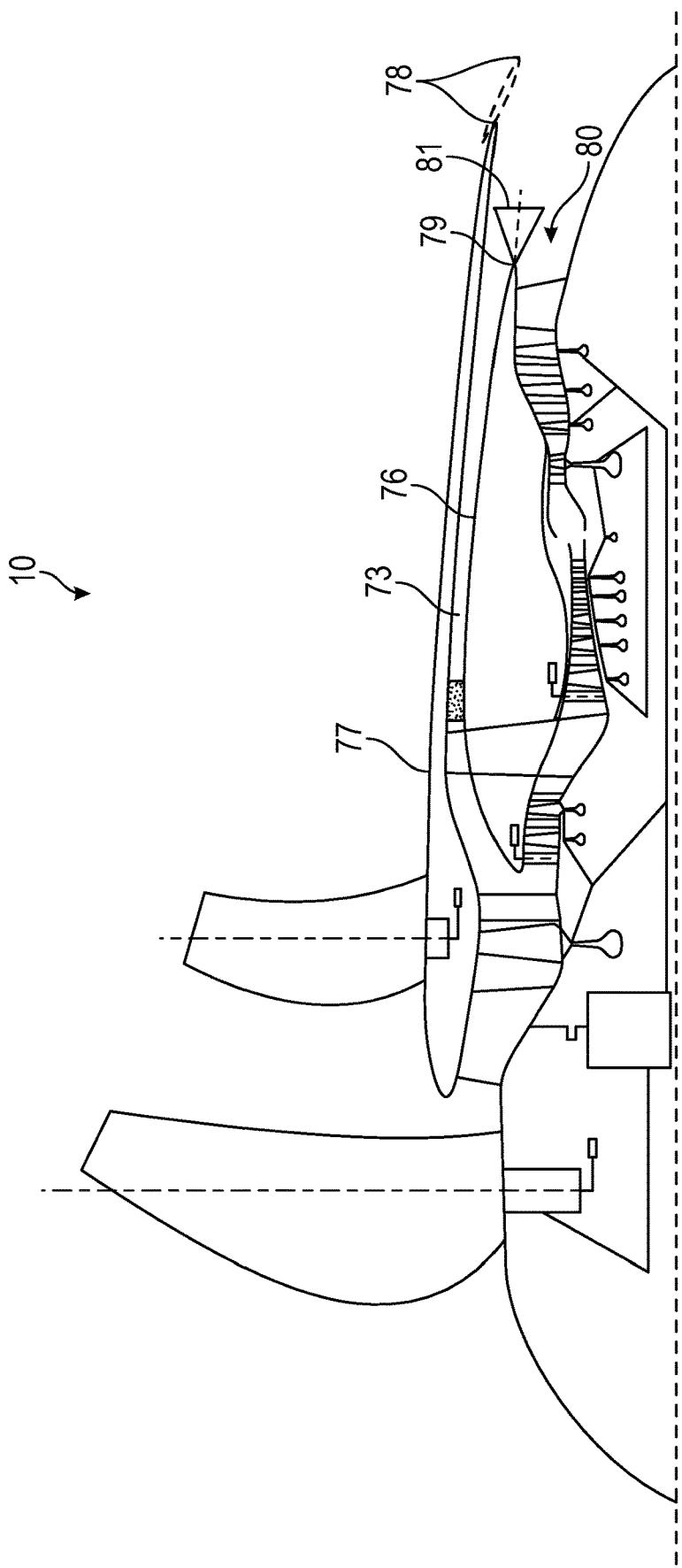
FIG. 9 is a cross-sectional schematic illustration of an exemplary embodiment of an open rotor propulsion system, having an elongated mixing duct.

FIG. 9 is a cross-sectional schematic illustration of an exemplary embodiment of an open rotor propulsion system 10, having an elongated mixing duct formed by an extended fan duct 73 extending between the fan cowl 77 and the core cowl 76 the full length of the core cowl 76 such that the fan nozzle 78 is downstream of the exhaust plane 80 of the core gas turbine engine and core nozzle 79. A mixing device 81 may be included in the region aft of the core nozzle 79 to aid in mixing the fan stream and core stream to improve acoustic performance by directing core stream outward and fan stream inward. Mixing is known to improve performance and noise emissions, particularly at a comparatively low bypass ratio (BPR) such as depicted in the Figures. Bypass ratios of 0.1 to 1 or 0.1 to 2 may be contemplated as exemplary ratios suitable for use with configurations described herein. It may be desirable that the nozzle 78 has a means to vary throat area. It may also be desirable that the mixer include variable geometry that allows for the optimization of the split between the hot side and cold side mixer areas to minimize losses as engine bypass ratio increases or decreases during normal operation.

As shown in FIG. 9, in one potential embodiment, which combines both variable mixing area and variable nozzle area, the core cowl 77 may include a translating mechanism to alter the position of the fan nozzle 78 (shown in 2 different positions with solid and dotted lines) in the axial direction, thereby providing another option for varying the nozzle exit area. Such variation may vary the hot-to-cold area ration between the two streams, by translating the fan nozzle or otherwise. The shape of the centerbody 81 will determine if only the area ratio varies or both A8 and the area ratio.

Figure 10:
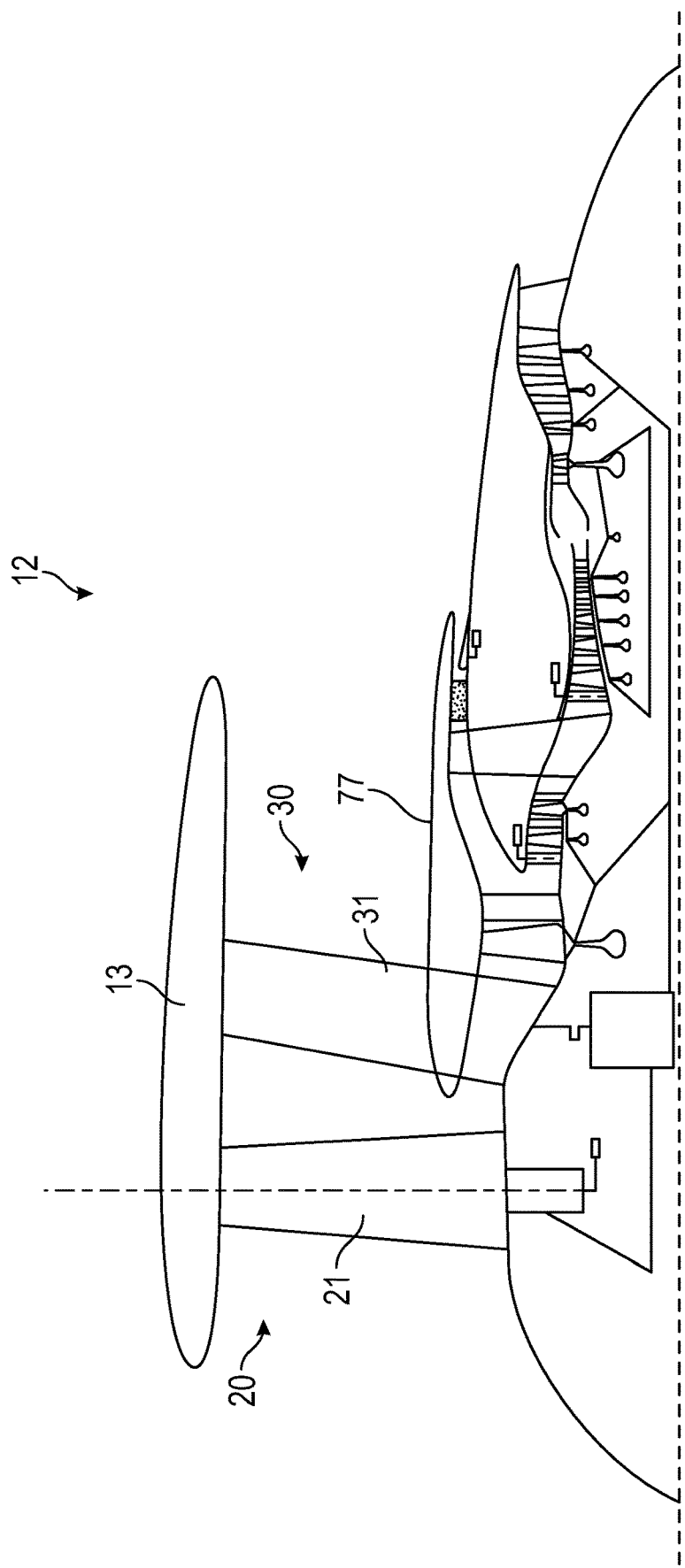
FIG. 10 is a cross-sectional schematic illustration of an exemplary embodiment of ducted propulsion system.

FIG. 10 is a cross-sectional schematic illustration of an exemplary embodiment of a ducted fan propulsion system 12. As many common elements are illustrated in FIG. 10 as in FIG. 1, like numerals are used to reference like elements. However, unlike the open rotor configuration of FIG. 1, the rotating element 20 and its airfoil blades 21 are contained within an annular fan case 13 and the stationary element 30 and the vanes 31 extend radially between the fan cowl 77 and the inner surface of the fan case 13. In this configuration, reverse thrust capability upon aircraft landing may be accomplished through a nacelle/thrust reverser system (not shown) or, advantageously, may be provided by the blades 21 in a reverse pitch configuration. As discussed above with respect to FIG. 1, the blades 21 of FIG. 10 may have a fixed pitch or blade angle, or may instead have a variable pitch or blade angle to vary thrust and blade loading during operation and, in some configurations, to provide a reverse thrust configuration for aircraft deceleration upon landing.

With regard to the exemplary embodiments depicted herein, either single or multiple gearboxes may be employed. A gearbox between the unducted fan and the ducted fan may have a ratio of between about 2:1 and 12:1, and a second gearbox between the booster and the ducted fan with a traditional HP turbine. Another configuration may utilize two counter-rotating turbines with two LP shafts coming forward, or counter-rotating turbines may drive a common LP shaft coming forward. In each case, an aft gearbox may have a ratio between about 2:1 and 5:1.

The dimensions between points identified with paired letters A-B, C-D, E-F, and G-H shown in the Drawing Figures are variables which may be tailored to provide the desired engine operating characteristics at desired flight and operating conditions.

Potential benefits achievable using the embodiments described herein include: reduced gearbox size and ratio; reduced fan and core speed variation over a wide operating range (improving performance of electrical power generation systems); improved core gas turbine operability during reverse thrust; expanded trade space between prop diameter (installation weight), gear ratio, booster stage count, and LPT loading; and reduced low pressure spool and high pressure spool speed migration.

The total desired thrust produced by the gas turbine engine may be varied as needed to suit the operational conditions and flight envelope for the associated aircraft. The maximum design work split between the unducted fan and the ducted fan may also be varied as needed, such as, for example, in certain embodiments up to approximately 60% of the total thrust may be produced by the ducted fan to minimize the engine diameter or noise, while in another embodiment only a few percent of the total thrust if the primary function of the ducted fan stream is as a thermal sink. Pressure ratios for the aft ducted fan may be less than about 2.5.

Gear box ranges may be tailored as well to suit the operating conditions and flight envelop for the gas turbine engine and associated aircraft, and gear box ratios may be split between multiple individual gearboxes. Other gearbox arrangements may be considered, such as adding counter-rotating stages, power-sharing, etc.

Figure 11:
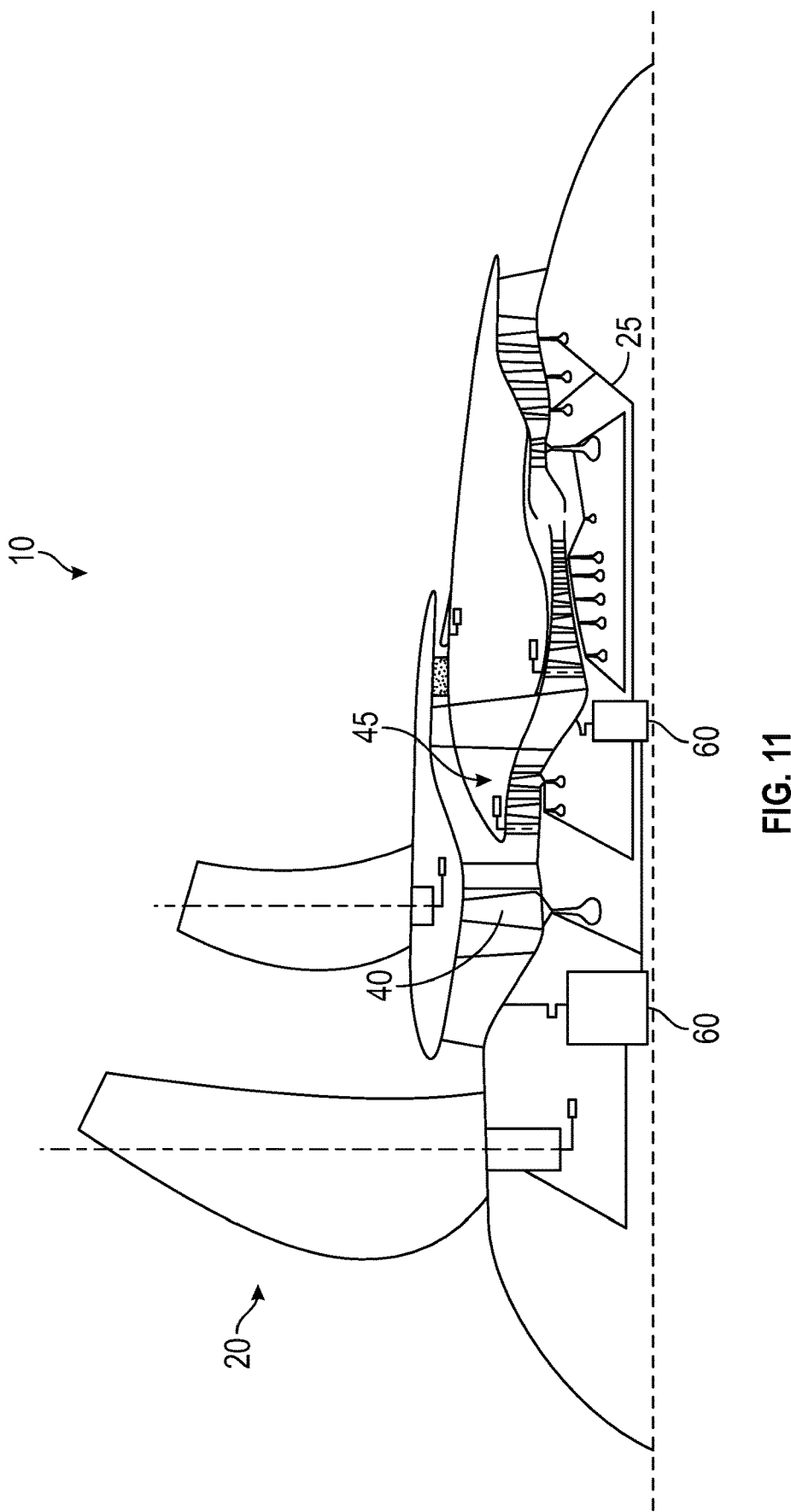
FIGS. 11-15 are cross-sectional schematic illustrations of exemplary embodiments of open rotor propulsion systems with varied gearbox installations.
Figure 12:
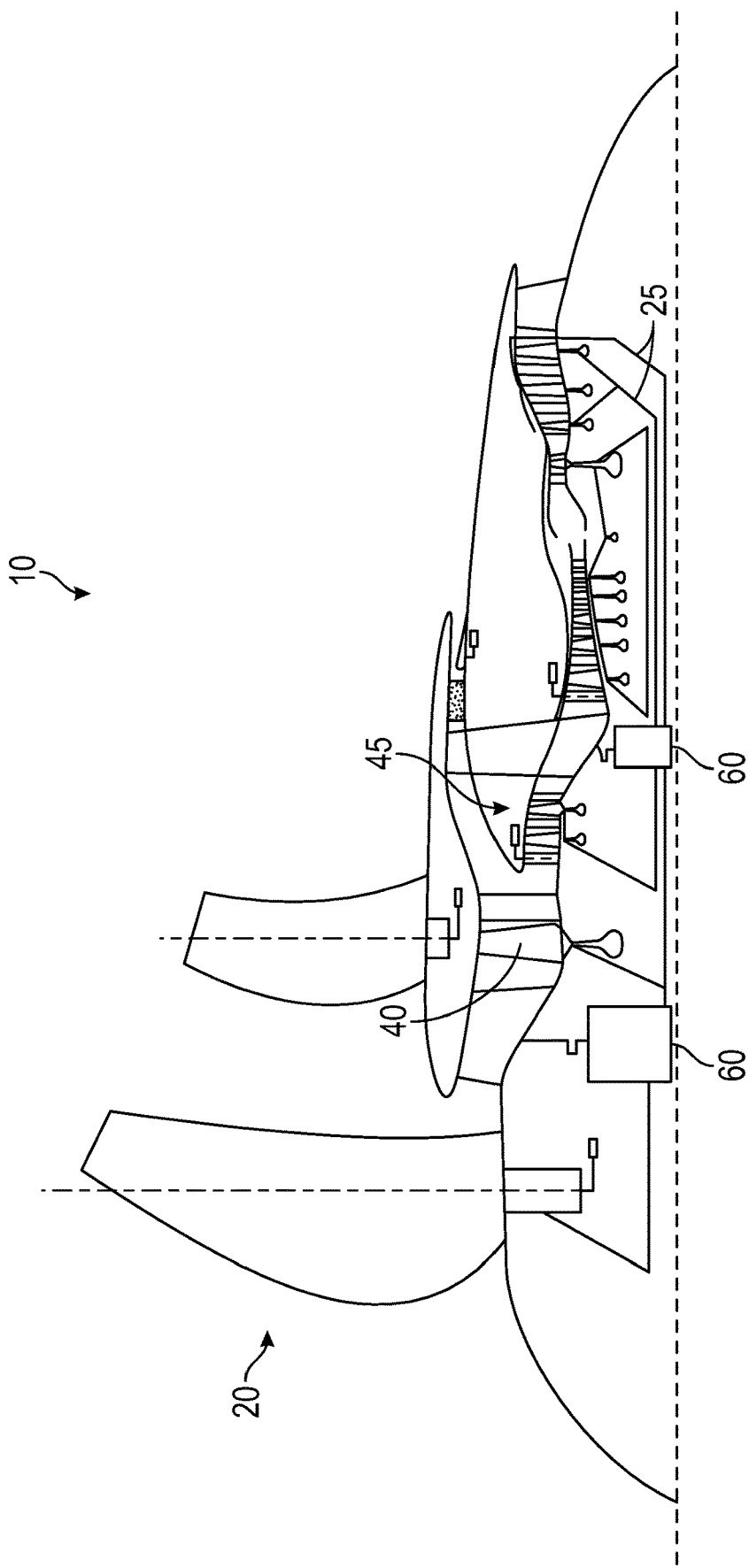
Figure 13:
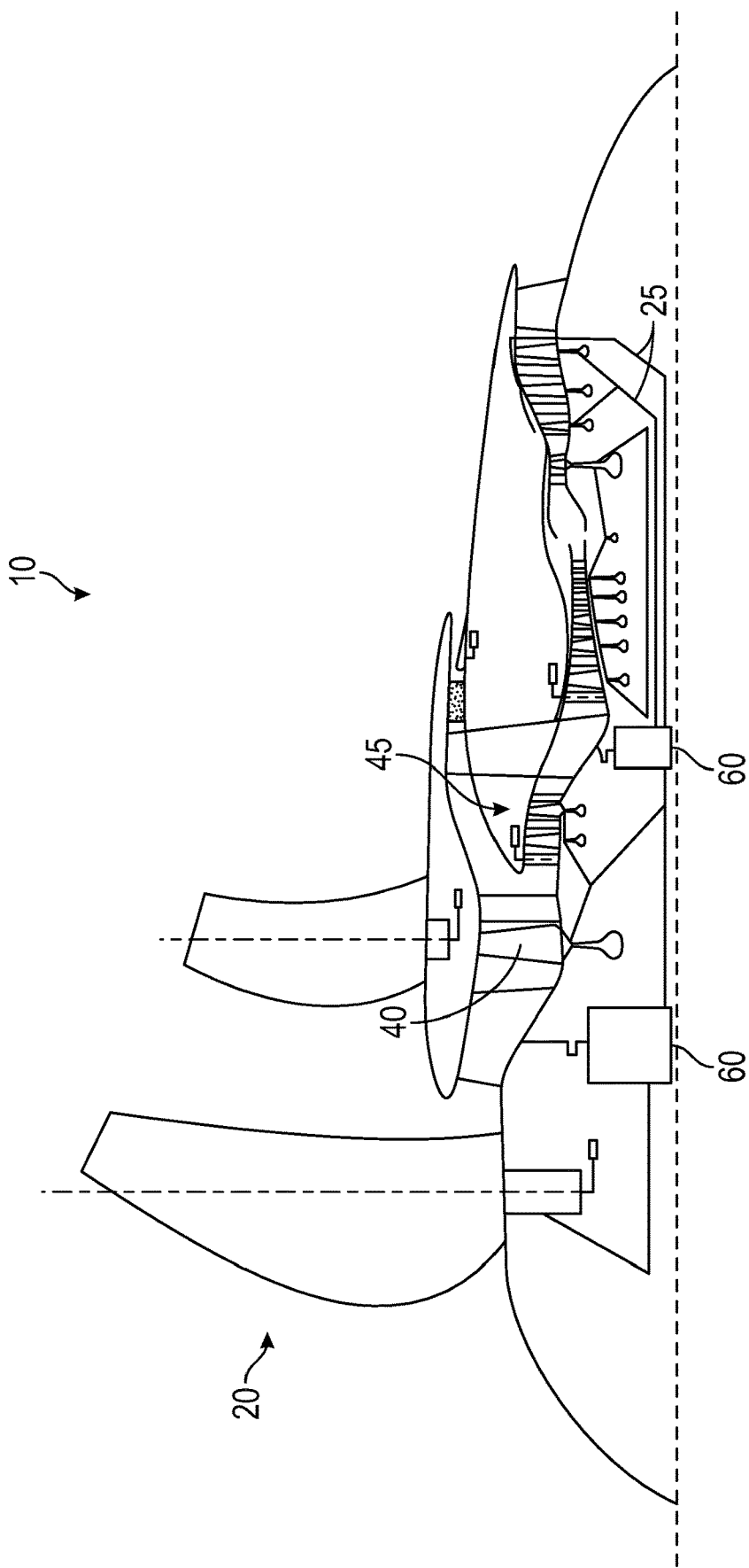
Figure 14:
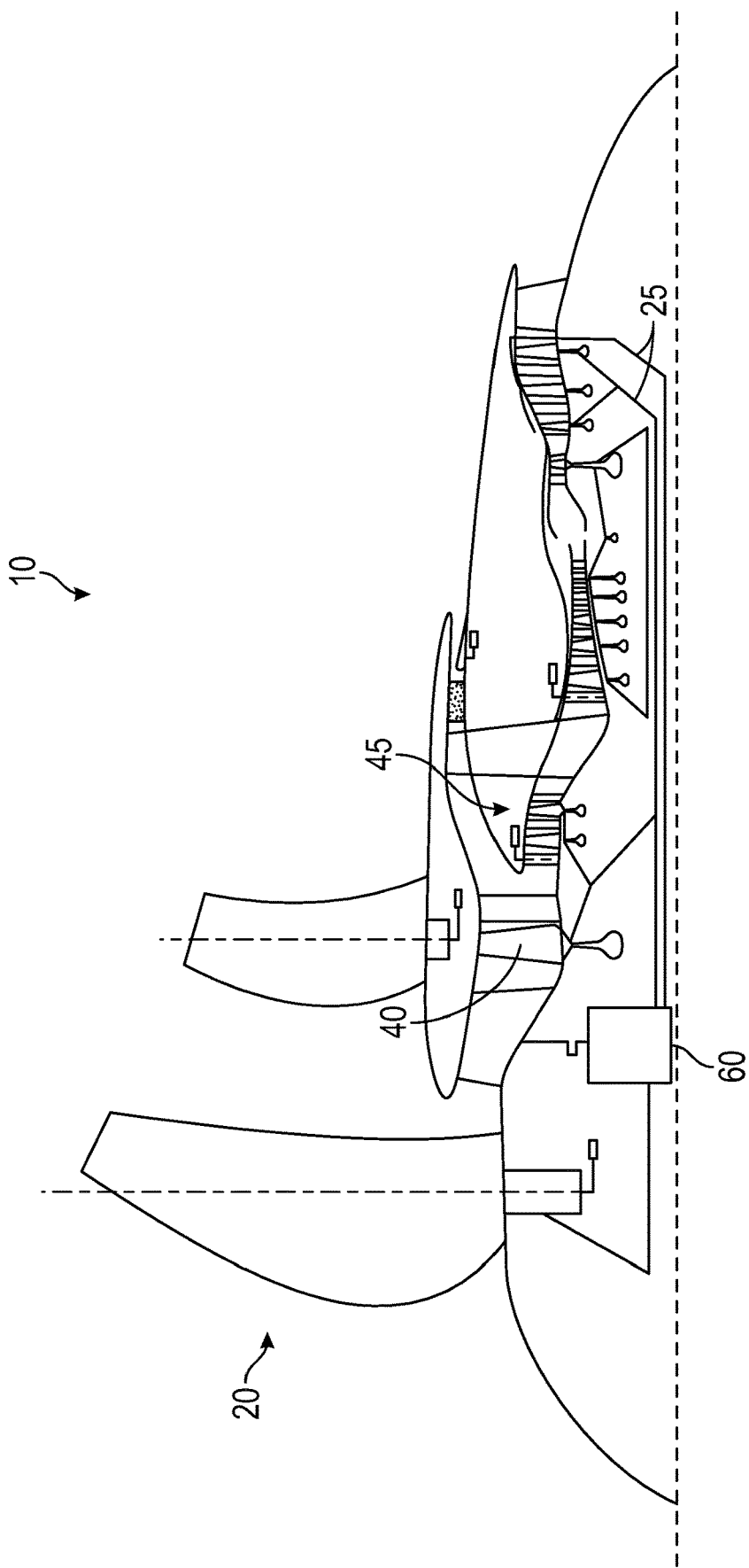
Figure 15:
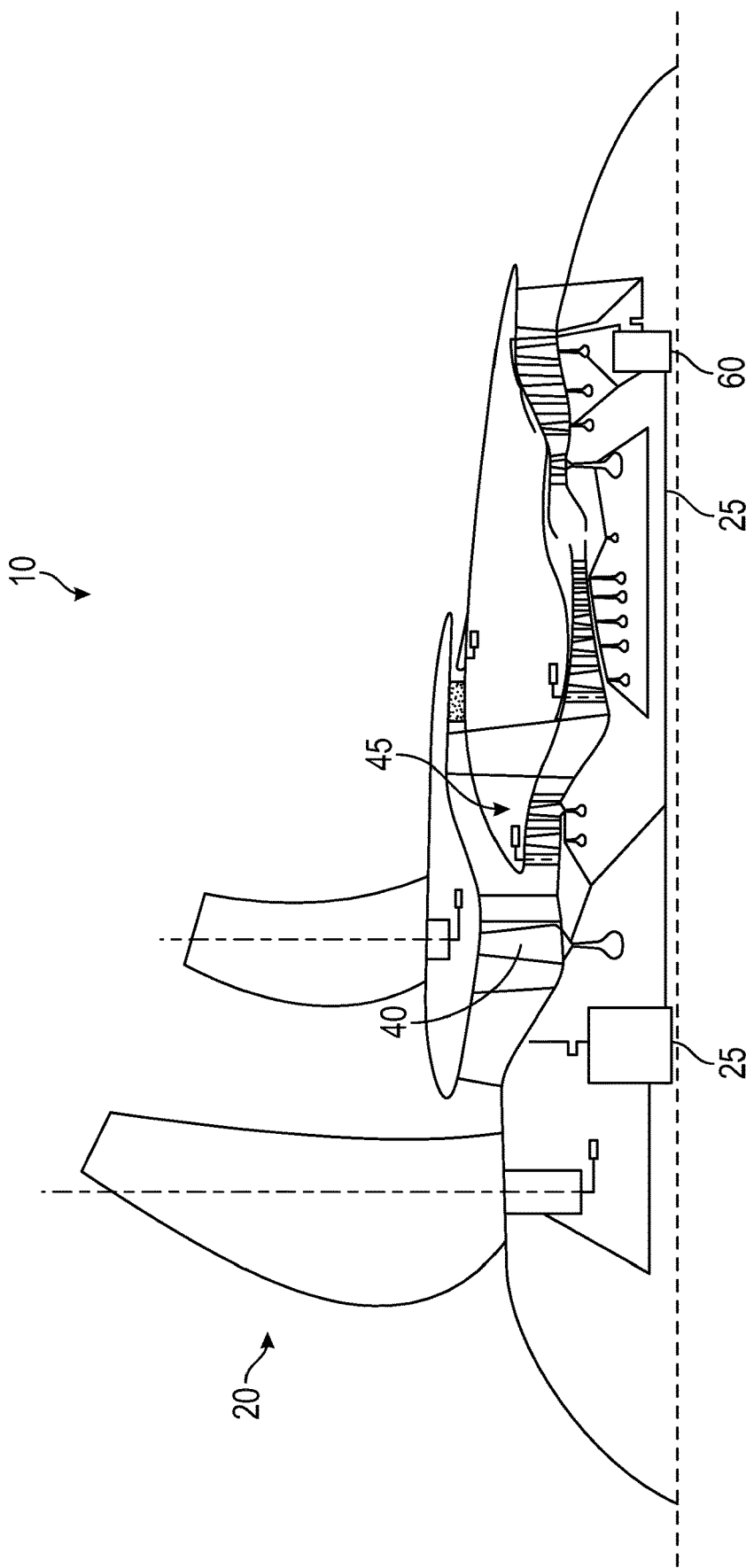

FIGS. 11-15 are cross-sectional schematic illustrations of exemplary embodiments of open rotor propulsion systems with varied gearbox installations. Like elements from prior Figures are referenced in FIGS. 11-15 by like numerals. FIG. 11 illustrates 2 gear boxes 60 for reducing rotational speed on the LP shaft 25 with the booster driven by the high speed side of the aft gear box 60 and the ducted fan driven by the low speed side of the aft most gear box 60. FIG. 12 illustrates 2 gear boxes 60 for reducing rotational speed on the LP shaft 25 driven by an interdigitated vaneless counter-rotating LP turbine, which has 2 sets of counter-rotating turbines blades with alternate rows on either a radially-inward rotating disk or a radially-outward rotating drum. FIG. 13 illustrates 2 gear boxes 60 with the booster and ducted fan driven at the same rotational speed from an interdigitated vaneless counter-rotating LP turbine. FIG. 14 illustrates a single gearbox 60 with the booster and ducted fan driven at the same rotational speed by an interdigitated vaneless counter-rotating LP turbine. Finally, FIG. 15 illustrates 2 gear boxes 60, one forward and one aft, with the booster and ducted fan driven at the same rotational speed from an interdigitated vaneless counter-rotating LP turbine.

Heat exchangers can be used to cool fluids and/or gases, depending upon the architecture of the engine. For example, the heat exchanger could cool oil, or it could be used to reject heat from air that is bled from the compressor. Heat exchangers can be of the surface cooler type, or a more traditional brick type cooler. Heat exchangers can be on the surface, fully immersed in the flowpath, or part of a structural strut that supports the inner portion of the frame.

In various embodiments, the source of power to drive the rotating element 20 may be a gas turbine engine fuelled by jet fuel or liquid natural gas, an electric motor, an internal combustion engine, or any other suitable source of torque and power and may be located in proximity to the rotating element 20 or may be remotely located with a suitably configured transmission such as a distributed power module system.

In addition to configurations suited for use with a conventional aircraft platform intended for horizontal flight, the technology described herein could also be employed for helicopter and tilt rotor applications and other lifting devices, as well as hovering devices.

Part 2

Figure 16:
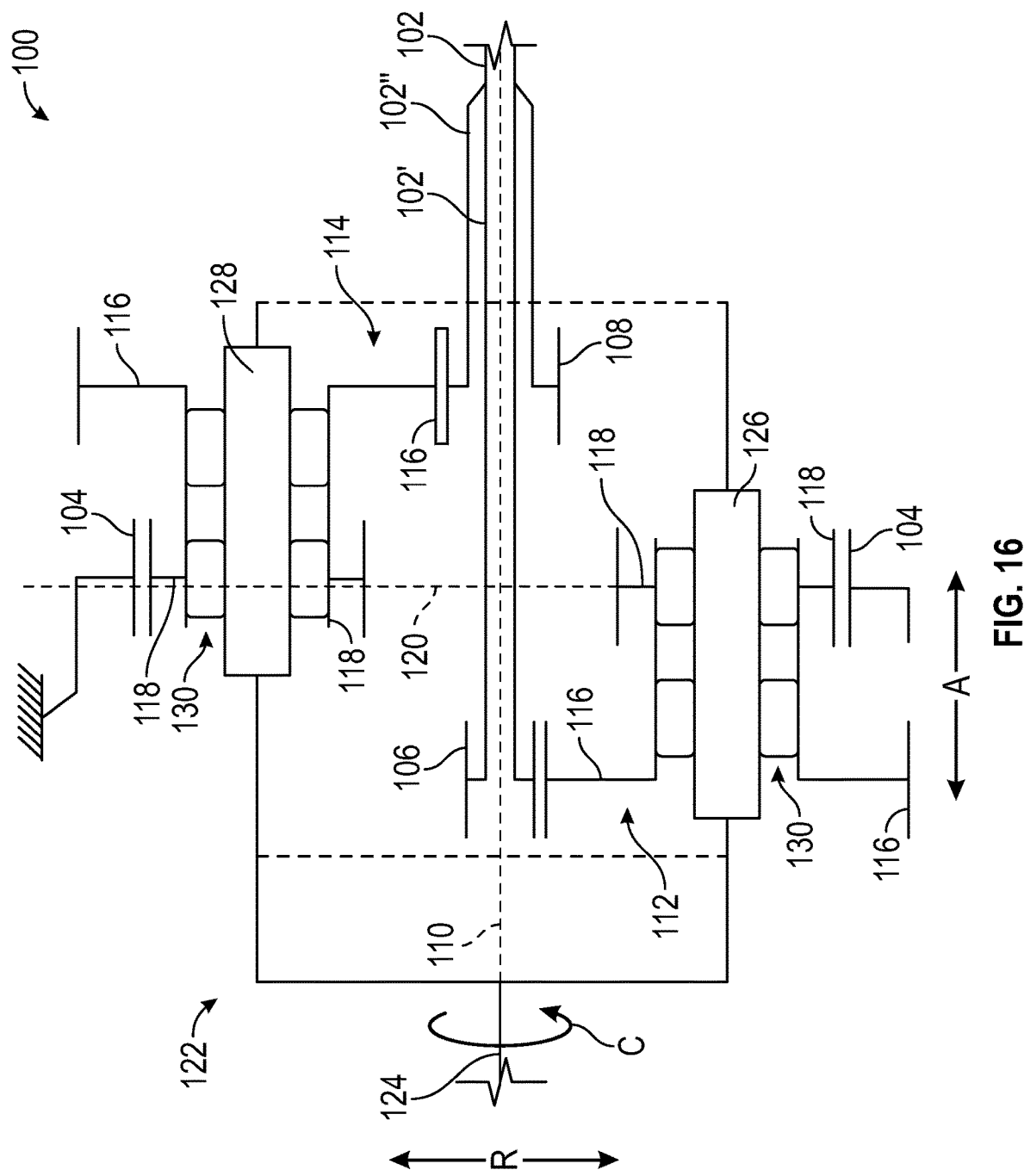
FIG. 16 is a gearbox in accordance with an exemplary embodiment of the present disclosure.

Referring now to FIG. 16, a schematic view is provided of a gearbox 100 in accordance with an embodiment of the present disclosure. The gearbox 100 may be utilized with one or more of the exemplary engines described above with reference to FIGS. 1 through 15 (e.g., as a gearbox 60 in engine 10).

However, in other exemplary embodiments, the gearbox 100 may additionally or alternatively be utilized with any other suitable engine, such as a ducted turbofan engine, a turboshaft engine, a turboprop engine, etc.

In such a manner, it will be appreciated that the gearbox 100 may generally be operable with an engine having a rotating element having a plurality of rotor blades and a turbomachine having a turbine and a shaft 102 rotatable with the turbine. With such an engine, the rotating element may be driven by the shaft 102 of the turbomachine across the gearbox 100.

For example, when incorporated into the exemplary engine of FIG. 1, the rotating element may be the rotor assembly 20, the rotor blades may be the blades 21, the turbine may be the low pressure turbine 50, and the shaft 102 may be the low pressure shaft 25. In such a manner, it will be appreciated that in certain embodiments, the engine may be configured as a single unducted rotor engine, such that the plurality of rotor blades of the rotating element is configured as a single stage of unducted rotor blades.

As is shown in FIG. 16, the gearbox 100 depicted generally includes a ring gear 104 that is static within the engine for the embodiment depicted. Additionally, the gearbox 100 includes a first sun gear 106 and a second sun gear 108 each driven by the shaft 102 of the turbomachine. In such a manner, the shaft 102 is split and coupled to the first sun gear 106 and the second sun gear 108 (e.g., includes first and second portions 102', 102"). The first and second sun gears 106, 108 are spaced along an axial direction A and are each rotatable about a longitudinal centerline 110, which may be aligned with a centerline axis 11 of the engine.

The gearbox 100 further includes a first planet gear 112 and a second planet gear 114. The first planet gear 112 is arranged between the first sun gear 106 and the ring gear 104 and the second planet gear 114 is arranged between the second sun gear 108 and the ring gear 104. Specifically, for the embodiment shown, the first planet gear 112 includes a first gear portion and a second gear portion, and the second planet gear 114 similarly includes a first gear portion and a second gear portion. More specifically, for the embodiment shown, the first planet gear 112 includes a high diameter gear portion 116 and a low diameter gear portion 118, with the high diameter gear portion 116 of the first planet gear 112 meshing with the first sun gear 106 at a location forward of the ring gear 104 and the low diameter gear portion 118 of the first planet gear 112 meshing with the ring gear 104. Further, a second planet gear 114 similarly includes a high diameter gear portion 116 and a low diameter gear portion 118, with the high diameter gear portion 116 of the second planet gear 114 meshing with the first sun gear 106 at a location aft of the ring gear 104, and the low diameter gear portion 118 of the second planet gear 114 meshing with the ring gear 104.

As used herein, the terms "high diameter gear portion 116" and "low diameter gear portion 118" refer to relative diameters of the gear of the gear portion referred to for the particular planet gear, and do not imply they diameters are bigger or smaller than other gears of other gearboxes, or than other gears of other planet gears. Further, when describing components of the gearbox 100 being forward or aft of the ring gear 104, such refers to being forward or aft of the meshing portion of the ring gear 104 (such as the teeth of the ring gear 104 or other similar structures).

In such a manner, it will further be appreciated that for the embodiment shown, the first sun gear 106 is positioned forward of the ring gear 104 and the second sun gear 108 is positioned aft of the ring gear 104.

It will further still be appreciated that the low diameter portions of the first and second planet gears 112, 114 are aligned with one another along a reference line 120 extending along the radial direction R of the engine, and further aligned with the ring gear 104 of the gearbox 100 along the reference line 120 extending along the radial direction R of the engine (such that they each define the same position along the axial direction A).

The exemplary gearbox 100 of FIG. 16 further includes a planet gear carrier 122. For the embodiment shown, the first and second planet gears 112, 114 are rotatably coupled to the planet gear carrier 122, and the planet gear carrier 122 is configured to rotate about the longitudinal centerline 110 in a circumferential direction C. In such a manner, it will be appreciated that the planet gear carrier 122 may be coupled to the rotating element of the engine for driving the rotating element of the engine. Specifically, for the embodiment shown, the planet gear carrier 122 includes an output shaft 124.

Briefly, it will be appreciated that in other exemplary embodiments, the planet gear carrier 122 may instead be stationary/static within the engine, and the ring gear 104 may be configured to rotate about the longitudinal centerline 110 in the circumferential direction C.

Referring still to FIG. 16, the planet gear carrier 122 shown has a first section 126 and a second section 128, with the first planet gear 112 rotatably coupled to the first section 126 of the planet gear carrier 122 and the second planet gear 114 rotatably coupled to the second section 128 of the planet gear carrier 122. For the embodiment shown the first section 126 is spaced from the second section 128 along the axial direction A, although the first and second sections 126, 128 do overlap along the axial direction A inward of the ring gear 104 of the gearbox 100.

The first section 126 and the second section 128 of the planet gear carrier 122 may each be configured as a pin or shaft about which a respective planet gear may rotate (i.e., about a local axis through the pin or shaft). For the embodiment shown, the gearbox 100 includes a set of bearings 130 between the pin or shaft of the planet gear carrier 122 and the respective planet gear. For the embodiment shown, the bearings 130 are roller bearings, but in other exemplary embodiments, the bearings 130 may additionally or alternatively be configured as tapered roller bearings, journal bearings, roller and ball bearings, air/gas bearings, ceramic bearings, etc.

Notably, although only the first and second planet gears 112, 114 are shown, it will be appreciated that the first planet gear 112 may be part of a first set of planet gears, and the second planet gear 114 may be part of a second set of planet gears. For example, the first set of planet gears may include at least two, such as up to six, such as three first planet gears 112 spaced along the circumferential direction C. Similarly, the second set of planet gears may include at least two, such as up to six, such as three second planet gears 114 spaced along the circumferential direction C. The first planet gears 112 and second planet gears 114 may be alternatingly arranged along the circumferential direction C to facilitate the low diameter gear portions 118 of these planet gears each coupling to the ring gear 104.

It will be appreciated that a gearbox 100 in accordance with such a configuration may allow for gear ratios of up to 14:1, such as up to 12:1. Still various embodiments of the gearbox 100 provided herein may allow for gear ratios of at least 4:1, such as at least 7:1.

Further, it will be appreciated that a gearbox 100 in accordance with the above configuration may allow for the relatively high gear ratios, such as at least 6:1, at least 7:1, at least 8:1, and up to 12:1, while having a relatively small axial and radial footprint within the engine. Such may be particularly beneficial for unducted gas turbine engines, such as a single unducted rotor engine, engines that include additional added components external to the engine core (such as embedded electrical machines), etc. Further, still, it will be appreciated that a gearbox 100 in accordance with such a configuration may allow for increased load sharing between the components of the gearbox 100. For example, the load on each of the sun gears is reduced by about half, and the load on the planet gears and the bearings therein is also reduced by about half.

According to one embodiment, a gas turbine engine is configured for use in an aircraft having a cruise speed above Mach 0.75. The engine includes a fan (ducted or unducted) that is variable pitch, and is driven by an engine core through a low pressure turbine shaft, which transmits torque to the fan through a reduction gearbox having a gear ratio between 6:1 and 12:1 or between 7:1 and 12:1. The gearbox includes a first planet gear 112 comprising a first gear portion and a second gear portion, wherein the first gear portion of the first planet gear 112 meshes with the first sun gear 106 at a location forward of the ring gear 104 along the axial direction A, and wherein the second gear portion of the first planet gear 112 meshes with the ring gear 104; and a second planet gear 114 comprising a first gear portion and a second gear portion, wherein the first gear portion of the second planet gear 114 meshes with the first sun gear 106 at a location aft of the ring gear 104 along the axial direction A, and wherein the second gear portion of the second planet gear 114 meshes with the ring gear 104.

Further still, it will be appreciated that a gearbox 100 in accordance with the above configuration may additionally provide the following benefits: relatively high gear ratio possible; reduces gearbox size (radial and/or axial); relatively low part count; relatively good efficiency; enable use of both journal and roller bearings; relatively lightweight; star or planetary configurations possible; same size of the bearings (less part numbers); mirrored arrangement around the second stage center plane, potential to achieve great load sharing factor between the two torque paths; one piece ring gear and planet carriers are possible; and new arrangement may improve misalignment control of the gears and bearings.

It will moreover be appreciated that the exemplary gearbox 100 of FIG. 16 is provided by way of example only. In other exemplary embodiments, the gearbox 100 may have any other suitable configuration. For example, referring now to FIG. 17, a gearbox 100 in accordance with another exemplary embodiment of the present disclosure is provided. The exemplary gearbox 100 of FIG. 17 may be configured in a similar manner as the exemplary gearbox 100 of FIG. 16.

Figure 17:
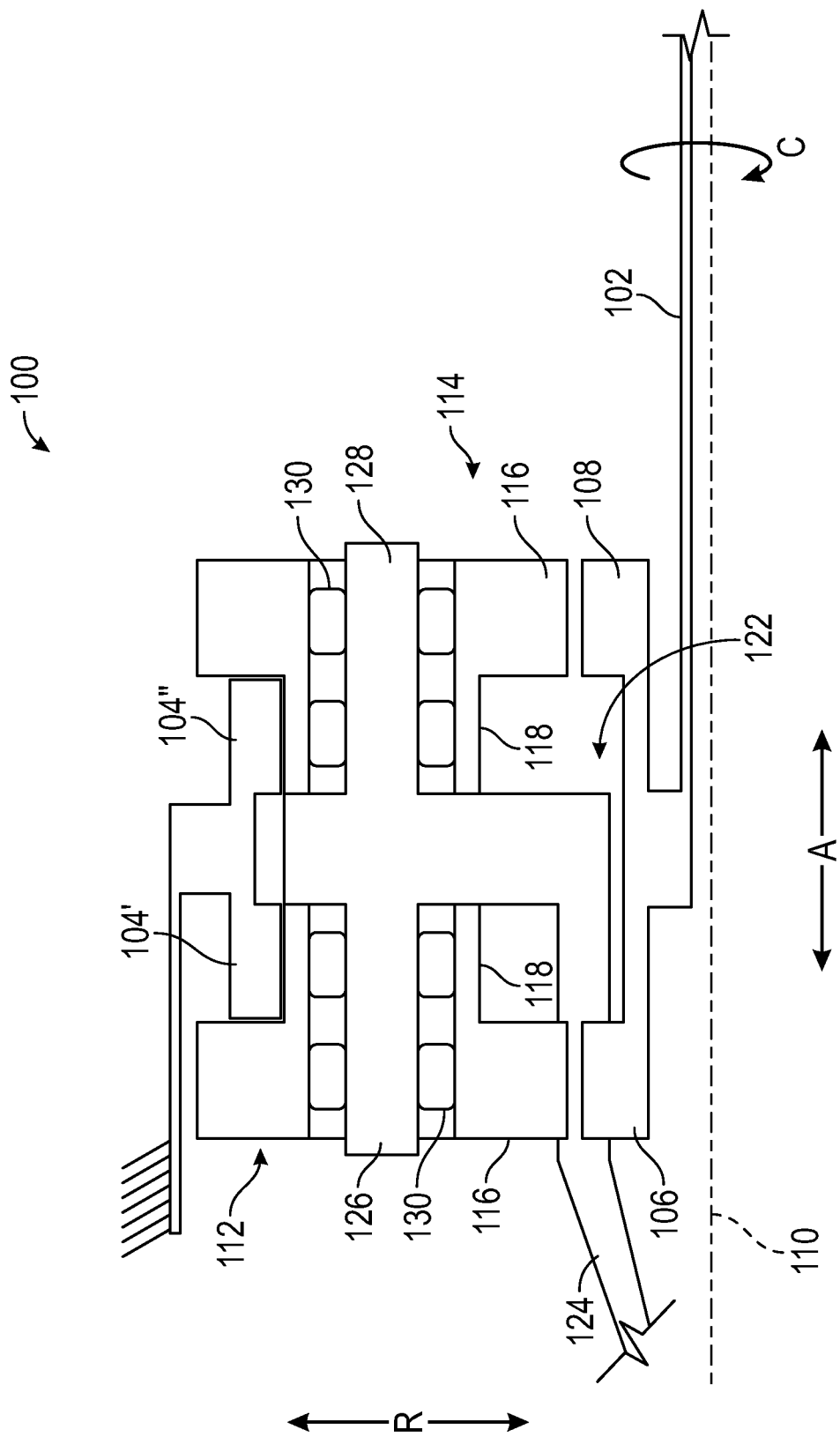
FIG. 17 is a gearbox in accordance with another exemplary embodiment of the present disclosure.

For example, the exemplary gearbox 100 of FIG. 17 generally includes: a ring gear 104; a first sun gear 106 and a second sun gear 108 each driven by the shaft 102 of the turbomachine; a first planet gear 112 comprising a high diameter gear portion 116 and a low diameter gear portion 118, wherein the high diameter gear portion 116 of the first planet gear 112 meshes with the first sun gear 106 at a location forward of the ring gear 104, and wherein the low diameter gear portion 118 of the first planet gear 112 meshes with the ring gear 104; and a second planet gear 114 comprising a high diameter gear portion 116 and a low diameter gear portion 118, wherein the high diameter gear portion 116 of the second planet gear 114 meshes with the first sun gear 106 at a location aft of the ring gear 104, and wherein the low diameter gear portion 118 of the second planet gear 114 meshes with the ring gear 104.

However, for the exemplary embodiment of FIG. 17, the low diameter gear portions 118 of the first and second planet gears 112, 114 are not aligned along the radial direction R with the ring gear 104 (i.e., do not have the same axial positions as one another along the longitudinal centerline 110), and further for the embodiment depicted, the ring gear 104 is configured as a split ring gear 104 having a forward ring gear portion 104' that meshes with the low diameter gear portion 118 of the first planet gear 112 and an aft ring gear portion 104" that meshes with the low diameter gear portion 118 of the second planet gear 114.

Moreover, for the exemplary embodiment shown, the first and second planet gears 112, 114 are not offset along the circumferential direction C and instead are aligned with one another along such that they each have the same circumferential positions. In such a manner, it will be appreciated that the first planet gear 112 and second planet gear 114 are each rotatable about a respective shaft or pin of the planet gear carrier 122 that are also aligned such that they also have the same circumferential positions. Specifically, for the embodiment shown a first portion 126 of the planet gear carrier 122 and a second portion 128 of the planet gear carrier 122 are aligned with one another along such that they each have the same circumferential positions.

It will be appreciated, however, that in other exemplary embodiments, the first and second planet gears 112, 114 may instead be offset from one another along the circumferential direction C.

Further aspects of the invention are provided by the subject matter of the following clauses:

An engine defining an axial direction A and a radial direction R, the engine comprising: a rotating element comprising a plurality of rotor blades; a turbomachine comprising a turbine and a shaft 102 rotatable with the turbine; and a gearbox 100, the rotating element driven by the shaft 102 of the turbomachine across the gearbox 100, the gearbox 100 comprising a ring gear 104; a first sun gear 106 and a second sun gear 108 each driven by the shaft 102 of the turbomachine; a first planet gear 112 comprising a first gear portion and a second gear portion, wherein the first gear portion of the first planet gear 112 meshes with the first sun gear 106 at a location forward of the ring gear 104 along the axial direction A, and wherein the second gear portion of the first planet gear 112 meshes with the ring gear 104; and a second planet gear 114 comprising a first gear portion and a second gear portion, wherein the first gear portion of the second planet gear 114 meshes with the first sun gear 106 at a location aft of the ring gear 104 along the axial direction A, and wherein the second gear portion of the second planet gear 114 meshes with the ring gear 104.

The engine of one or more of the previous clauses, wherein the first gear portions of the first and second planet gears 112, 114 are each a high diameter gear portion 116, and wherein the second gear portions of the first and second planet gears 112, 114 are each a low diameter gear portion 118.

The engine of one or more of the previous clauses, wherein the gearbox 100 further comprises a planet gear carrier 122 having a first section 126 and a second section 128, wherein the first planet gear 112 is rotatably coupled to the first section 126 of the planet gear carrier 122, wherein the second planet gear 114 is rotatably coupled to the second section 128 of the planet gear carrier 122, and wherein the first section 126 is spaced from the second section 128 along the axial direction A.

The engine of one or more of the previous clauses, wherein the gearbox 100 further comprises a planet gear carrier 122 having a first section 126 and a second section 128, wherein the first planet gear 112 is rotatably coupled to the first section 126 of the planet gear carrier 122, wherein the second planet gear 114 is rotatably coupled to the second section 128 of the planet gear carrier 122, wherein the gearbox 100 further comprises a first set of bearings positioned between the first section 126 of the planet gear carrier 122 and the first planet gear 112 and a second set of bearings positioned between the second section 128 of the planet gear carrier 122 and the second planet gear 114.

The engine of one or more of the previous clauses, wherein the first set of bearings are configured as a set of roller bearings or journal bearings, and wherein the second set of bearings are also configured as a set of roller bearings or journal bearings.

The engine of one or more of the previous clauses, wherein the gearbox 100 further comprises a planet gear carrier 122, wherein the first and second planet gears 112, 114 are rotatably coupled to the planet gear carrier 122, and wherein the planet gear carrier 122 is coupled to the rotating element for driving the rotating element.

The engine of one or more of the previous clauses, wherein the engine is configured as a single unducted rotor engine.

The engine of one or more of the previous clauses, wherein the plurality of rotor blades of the rotating element is configured as a single stage of unducted rotor blades.

The engine of one or more of the previous clauses, wherein the first sun gear 106 is positioned forward of the ring gear 104 and wherein the second sun gear 108 is positioned aft of the ring gear 104.

The engine of one or more of the previous clauses, wherein the ring gear 104 is static within the engine.

An engine defining an axial direction A and a radial direction R, the engine comprising: a rotating element comprising a plurality of rotor blades; a turbomachine comprising a turbine and a shaft 102 rotatable with the turbine; and a gearbox 100, the rotating element driven by the shaft 102 of the turbomachine across the gearbox 100, the gearbox 100 comprising a ring gear 104; a first sun gear 106 and a second sun gear 108 each driven by the shaft 102 of the turbomachine; a first planet gear 112 comprising a first gear portion and a second gear portion, wherein the first gear portion of the first planet gear 112 meshes with the first sun gear 106 and wherein the second gear portion of the first planet gear 112 meshes with the ring gear 104; and a second planet gear 114 comprising a first gear portion and a second gear portion, wherein the first gear portion of the second planet gear 114 meshes with the first sun gear 106 and wherein the second gear portion of the second planet gear 114 meshes with the ring gear 104; wherein the first sun gear 106 is located forward of the ring gear 104 along the axial direction A and wherein the second sun gear 108 is located aft of the ring gear 104 along the axial direction A.

A gearbox 100 for an engine comprising a rotating element and a turbomachine, the turbomachine comprising a shaft 102, and the rotating element driven by the shaft 102 across the gearbox 100, the gearbox 100 comprising: a ring gear 104; a first sun gear 106 and a second sun gear 108 each configured to be driven by the shaft 102 of the turbomachine; a first planet gear 112 comprising a first gear portion and a second gear portion, wherein the first gear portion of the first planet gear 112 meshes with the first sun gear 106 at a location forward of the ring gear 104 along the axial direction A, and wherein the second gear portion of the first planet gear 112 meshes with the ring gear 104; and a second planet gear 114 comprising a first gear portion and a second gear portion, wherein the first gear portion of the second planet gear 114 meshes with the first sun gear 106 at a location aft of the ring gear 104 along the axial direction A, and wherein the second gear portion of the second planet gear 114 meshes with the ring gear 104.

A gearbox 100 for an engine comprising a rotating element and a turbomachine, the turbomachine comprising a shaft 102, and the rotating element driven by the shaft 102 across the gearbox 100, the gearbox 100 comprising: a ring gear 104; a first sun gear 106 and a second sun gear 108 each configured to be driven by the shaft 102 of the turbomachine; a first planet gear 112 comprising a first gear portion and a second gear portion, wherein the first gear portion of the first planet gear 112 meshes with the first sun gear 106 and wherein the second gear portion of the first planet gear 112 meshes with the ring gear 104; and a second planet gear 114 comprising a first gear portion and a second gear portion, wherein the first gear portion of the second planet gear 114 meshes with the first sun gear 106 and wherein the second gear portion of the second planet gear 114 meshes with the ring gear 104; wherein the first sun gear 106 is located forward of the ring gear 104 along the axial direction A and wherein the second sun gear 108 is located aft of the ring gear 104 along the axial direction A.

While this disclosure has been described as having exemplary embodiments, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An engine defining an axial direction (A) and a radial direction (R), the engine comprising:
   a rotating element comprising a plurality of rotor blades;
   a turbomachine comprising a turbine and a shaft rotatable with the turbine; and
   a gearbox, the rotating element driven by the shaft of the turbomachine across the gearbox, the gearbox comprising:
   a ring gear;
   a first sun gear and a second sun gear each directly coupled to, and driven by, the shaft of the turbomachine;
   a first planet gear comprising a first gear portion and a second gear portion, wherein the first gear portion of the first planet gear meshes with the first sun gear at a location forward of the ring gear along the axial direction (A), and wherein the second gear portion of the first planet gear meshes with the ring gear; and
   a second planet gear comprising a first gear portion and a second gear portion, wherein the first gear portion of the second planet gear meshes with the first sun gear at a location aft of the ring gear along the axial direction (A), and wherein the second gear portion of the second planet gear meshes with the ring gear.

2. The engine of claim 1, wherein the first gear portion of the first planet gear and the first gear portion of the second planet gear are each a high diameter gear portion, and wherein the second gear portion of the first planet gear and the second gear portion of the second planet gear are each a low diameter gear portion.

3. The engine of claim 1, wherein the gearbox further comprises a planet gear carrier having a first section and a second section, wherein the first planet gear is rotatably coupled to the first section of the planet gear carrier, wherein the second planet gear is rotatably coupled to the second section of the planet gear carrier, and wherein the first section is spaced from the second section along the axial direction (A).

4. The engine of claim 1, wherein the gearbox further comprises a planet gear carrier having a first section and a second section, wherein the first planet gear is rotatably coupled to the first section of the planet gear carrier, wherein the second planet gear is rotatably coupled to the second section of the planet gear carrier, wherein the gearbox further comprises a first set of bearings positioned between the first section of the planet gear carrier and the first planet gear and a second set of bearings positioned between the second section of the planet gear carrier and the second planet gear.

5. The engine of claim 4, wherein the first set of bearings are configured as a set of roller bearings or a set of journal bearings, and wherein the second set of bearings are also configured as a set of roller bearings or a set of journal bearings.

6. The engine of claim 1, wherein the gearbox further comprises a planet gear carrier, wherein the first and second planet gears are rotatably coupled to the planet gear carrier, and wherein the planet gear carrier is coupled to the rotating element for driving the rotating element.

7. The engine of claim 1, wherein the engine is configured as a single unducted rotor engine.

8. The engine of claim 1, wherein the plurality of rotor blades of the rotating element is configured as a single stage of unducted rotor blades.

9. The engine of claim 1, wherein the first sun gear is positioned forward of the ring gear and wherein the second sun gear is positioned aft of the ring gear.

10. The engine of claim 1, wherein the ring gear is static within the engine.

11. An engine defining an axial direction (A) and a radial direction (R), the engine comprising:
    a rotating element comprising a plurality of rotor blades;
    a turbomachine comprising a turbine and a shaft rotatable with the turbine; and a gearbox, the rotating element driven by the shaft of the turbomachine across the gearbox, the gearbox comprising:
a ring gear;
a first sun gear and a second sun gear each directly coupled to, and driven by, the shaft of the turbomachine;
a first planet gear comprising a first gear portion and a second gear portion, wherein the first gear portion of the first planet gear meshes with the first sun gear and wherein the second gear portion of the first planet gear meshes with the ring gear; and
a second planet gear comprising a first gear portion and a second gear portion, wherein the first gear portion of the second planet gear meshes with the first sun gear and wherein the second gear portion of the second planet gear meshes with the ring gear;
wherein the first sun gear is located forward of the ring gear along the axial direction (A) and wherein the second sun gear is located aft of the ring gear along the axial direction (A).

12. A gearbox for an engine comprising a rotating element and a turbomachine, the turbomachine comprising a shaft, and the rotating element driven by the shaft across the gearbox, the gearbox comprising:
a ring gear;
a first sun gear and a second sun gear each directly coupled to, and configured to be driven by, the shaft of the turbomachine;
a first planet gear comprising a first gear portion and a second gear portion, wherein the first gear portion of the first planet gear meshes with the first sun gear at a location forward of the ring gear along an axial direction (A) of the engine, and wherein the second gear portion of the first planet gear meshes with the ring gear; and
a second planet gear comprising a first gear portion and a second gear portion, wherein the first gear portion of the second planet gear meshes with the first sun gear at a location aft of the ring gear along the axial direction (A), and wherein the second gear portion of the second planet gear meshes with the ring gear.

13. A gearbox for an engine comprising a rotating element and a turbomachine, the turbomachine comprising a shaft, and the rotating element driven by the shaft across the gearbox, the gearbox comprising:
a ring gear;
a first sun gear and a second sun gear each directly coupled to, and configured to be driven by, the shaft of the turbomachine;
a first planet gear comprising a first gear portion and a second gear portion, wherein the first gear portion of the first planet gear meshes with the first sun gear and wherein the second gear portion of the first planet gear meshes with the ring gear; and
a second planet gear comprising a first gear portion and a second gear portion, wherein the first gear portion of the second planet gear meshes with the first sun gear and wherein the second gear portion of the second planet gear meshes with the ring gear;
wherein the first sun gear is located forward of the ring gear along an axial direction (A) of the engine and wherein the second sun gear is located aft of the ring gear along the axial direction (A).

14. A gas turbine engine configured for propelling an aircraft at a cruising speed of above Mach 0.75, the gas turbine engine comprising:
an engine core having a low pressure turbine shaft;
a variable pitch fan; and
a reduction gearbox having a gear ratio of between 6:1 to 12:1, the variable pitch fan being driven by the low pressure turbine shaft across the reduction gearbox, the reduction gearbox comprising:
a ring gear;
a first sun gear and a second sun gear each directly coupled to, and driven by, the low pressure turbine shaft;
a first planet gear comprising a first gear portion and a second gear portion, wherein the first gear portion of the first planet gear meshes with the first sun gear at a location forward of the ring gear along an axial direction (A) of the gas turbine engine, and wherein the second gear portion of the first planet gear meshes with the ring gear; and
a second planet gear comprising a first gear portion and a second gear portion, wherein the first gear portion of the second planet gear meshes with the first sun gear at a location aft of the ring gear along the axial direction (A), and wherein the second gear portion of the second planet gear meshes with the ring gear.

* * * * *